(12) United States Patent
Jaeker et al.

(10) Patent No.: US 12,135,070 B2
(45) Date of Patent: Nov. 5, 2024

(54) ENERGY GUIDE CHAIN WITH FLEXIBLE JOINT CONNECTORS AS WELL AS SIDE PLATES AND JOINT CONNECTORS FOR SAME

(71) Applicant: IGUS GMBH, Cologne (DE)

(72) Inventors: Thilo-Alexander Jaeker, Sankt Augustin (DE); Andreas Hermey, Hennef (DE)

(73) Assignee: IGUS GMBH, Cologne (DE)

( * ) Notice: Subject to any disclaimer, the term of this patent is extended or adjusted under 35 U.S.C. 154(b) by 45 days.

(21) Appl. No.: 17/999,897

(22) PCT Filed: May 26, 2021

(86) PCT No.: PCT/EP2021/064071
§ 371 (c)(1),
(2) Date: Nov. 25, 2022

(87) PCT Pub. No.: WO2021/239821
PCT Pub. Date: Dec. 2, 2021

(65) Prior Publication Data
US 2023/0220905 A1    Jul. 13, 2023

(30) Foreign Application Priority Data

May 27, 2020 (DE) ...................... 20 2020 103 046.9
Apr. 9, 2021 (DE) ...................... 20 2021 101 897.6
Apr. 10, 2021 (DE) ...................... 20 2021 101 933.6

(51) Int. Cl.
*F16G 13/16* (2006.01)
*H02G 3/04* (2006.01)
*H02G 11/00* (2006.01)

(52) U.S. Cl.
CPC ........... *F16G 13/16* (2013.01); *H02G 3/0475* (2013.01); *H02G 11/006* (2013.01)

(58) Field of Classification Search
CPC ..... F16G 13/16; H02G 3/0475; H02G 11/006
See application file for complete search history.

(56) References Cited

U.S. PATENT DOCUMENTS

| 5,048,283 A | 9/1991 | Moritz et al. |
| 6,745,555 B2 | 6/2004 | Hermey et al. |

(Continued)

FOREIGN PATENT DOCUMENTS

| AU | 2010224453 | 4/2011 |
| DE | 3928238 | 10/1990 |

(Continued)

OTHER PUBLICATIONS

International Search Report from corresponding PCT Appln. No. PCT/EP2021/064071, dated Sep. 16, 2021.

(Continued)

*Primary Examiner* — Amy J. Sterling
(74) *Attorney, Agent, or Firm* — Grossman, Tucker, Perreault & Pfleger, PLLC

(57) ABSTRACT

Energy chains having flexible joint connectors, and lateral tabs and a joint connector therefor. The lateral tabs are symmetrical by stop surfaces thereof, wherein each lateral tab comprises two protrusions having stop surfaces and two pockets having counterpart stop surfaces. According to one aspect, the protrusions and the pockets are provided symmetrically on the lateral tab. According to one aspect, the joint connector for lateral tabs has a plate-like body having a resiliently flexible joint region, two material regions opposingly arched outward having a cavity therebetween, and two opposite fastening regions on the end. According to one aspect, the energy chain is designed such that, continuously over a chain portion comprising at least more than three adjacent chain links, which comprises the at least two (Continued)

tab strands, the tab strands are structured overall continuously from tabs which are identical to each other.

31 Claims, 10 Drawing Sheets

(56) References Cited

U.S. PATENT DOCUMENTS

| | | | |
|---|---|---|---|
| 6,992,254 B2 | 1/2006 | Komiya | |
| 7,073,299 B1* | 7/2006 | diGirolamo | E04B 2/7453 |
| | | | 52/745.11 |
| 7,204,075 B2 | 4/2007 | Utaki | |
| 7,591,128 B2 | 9/2009 | Komiya | |
| 7,637,092 B2* | 12/2009 | Utaki | F16G 13/16 |
| | | | 59/900 |
| 7,669,402 B2* | 3/2010 | Blase | H02G 11/006 |
| | | | 59/900 |
| 7,677,024 B2 | 3/2010 | Utaki | |
| 7,893,353 B2* | 2/2011 | Utaki | H02G 3/0456 |
| | | | 59/900 |
| 8,919,093 B2* | 12/2014 | Komiya | H02G 3/0475 |
| | | | 59/900 |
| 9,328,795 B2* | 5/2016 | Blase | F16F 13/16 |
| 9,476,480 B2 | 12/2016 | Hermey et al. | |
| 2009/0039196 A1 | 2/2009 | Komiya et al. | |
| 2018/0261985 A1* | 9/2018 | Aro-Heinilä | H02G 3/0475 |
| 2018/0331522 A1* | 11/2018 | Galetti | F16L 3/015 |
| 2018/0361960 A1* | 12/2018 | Yamamoto | B60R 16/0215 |
| 2019/0173269 A1* | 6/2019 | Hermey | H02G 3/0608 |
| 2019/0195316 A1* | 6/2019 | Moritz | H02G 3/0475 |
| 2019/0219135 A1* | 7/2019 | Chen | H02G 11/006 |
| 2019/0234142 A1* | 8/2019 | Grützner | H02G 11/006 |
| 2019/0329665 A1* | 10/2019 | Curran | B60L 53/12 |
| 2020/0014186 A1* | 1/2020 | Howold | H02G 11/006 |
| 2020/0099205 A1* | 3/2020 | Yamamoto | B60N 2/0264 |
| 2020/0108783 A1* | 4/2020 | Enomoto | F16G 13/16 |
| 2020/0130942 A1* | 4/2020 | Tetsuka | H02G 11/00 |
| 2020/0144805 A1* | 5/2020 | Kang | H02G 3/0475 |
| 2021/0053513 A1* | 2/2021 | Uno | H02G 11/00 |
| 2021/0088111 A1* | 3/2021 | Jaeker | F16G 13/16 |
| 2021/0138628 A1* | 5/2021 | Doerflinger | H01R 13/72 |
| 2021/0181265 A1* | 6/2021 | Jaeker | F16G 13/16 |
| 2021/0285517 A1* | 9/2021 | Tetsuka | H02G 3/0406 |
| 2021/0285518 A1* | 9/2021 | Isoda | F16G 13/16 |
| 2022/0006278 A1* | 1/2022 | Zhang | H01R 11/01 |
| 2022/0082185 A1* | 3/2022 | Faith | F16L 3/015 |
| 2022/0145964 A1* | 5/2022 | Hermey | F16G 13/16 |
| 2022/0173582 A1* | 6/2022 | Isoda | B60R 16/02 |
| 2022/0252137 A1* | 8/2022 | Kemper | F16G 13/16 |
| 2022/0268338 A1* | 8/2022 | Pütz | H03K 17/945 |
| 2023/0025581 A1* | 1/2023 | Dommnik | H02G 3/04 |
| 2023/0038431 A1* | 2/2023 | Habering | H02G 11/00 |
| 2023/0042568 A1* | 2/2023 | Hermey | H02G 11/006 |
| 2023/0106446 A1* | 4/2023 | Yagawa | F16F 15/08 |
| | | | 414/266 |
| 2023/0375256 A1* | 11/2023 | Park | F16G 13/16 |

FOREIGN PATENT DOCUMENTS

| | | |
|---|---|---|
| DE | 102005026667 | 12/2005 |
| DE | 102006027246 | 12/2007 |
| DE | 102008020907 | 11/2008 |
| DE | 102008020908 | 11/2008 |
| DE | 102008034182 | 2/2009 |
| DE | 202019101354 | 6/2019 |
| EP | 1351362 | 10/2003 |
| WO | 02086349 | 10/2002 |
| WO | 2012131033 | 10/2012 |
| WO | 2014161763 | 10/2014 |
| WO | 2015160032 | 10/2015 |
| WO | 2017158855 | 9/2017 |

OTHER PUBLICATIONS

International Preliminary Report on Patentability from corresponding PCT Appln. No. PCT/EP2021/064071, dated Oct. 6, 2022.

* cited by examiner

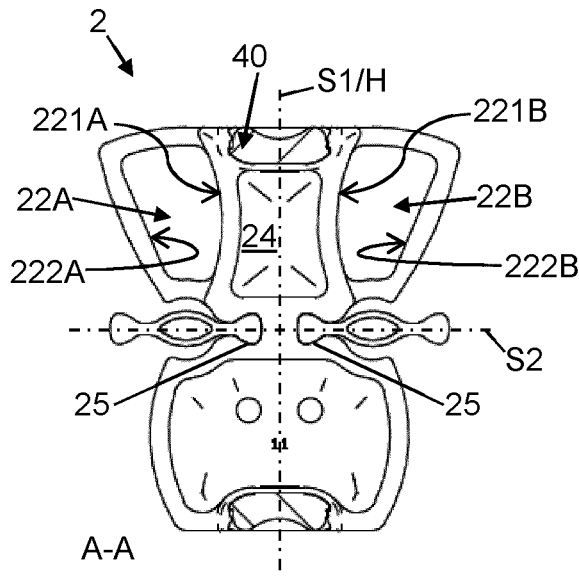
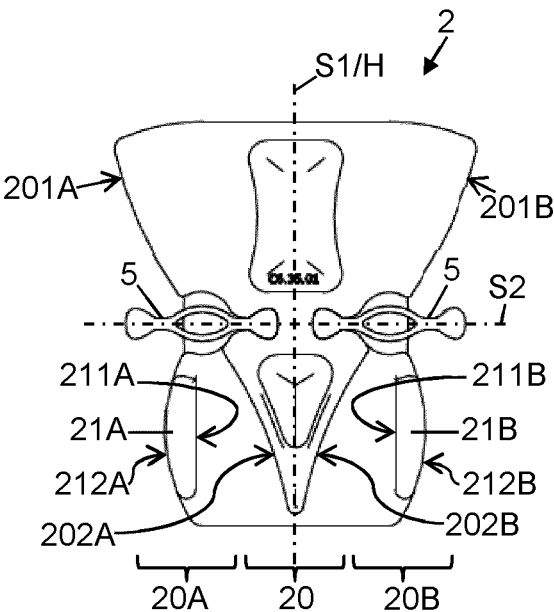
FIG.2A
FIG.2B
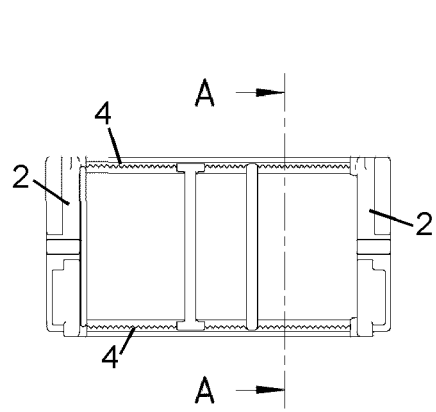
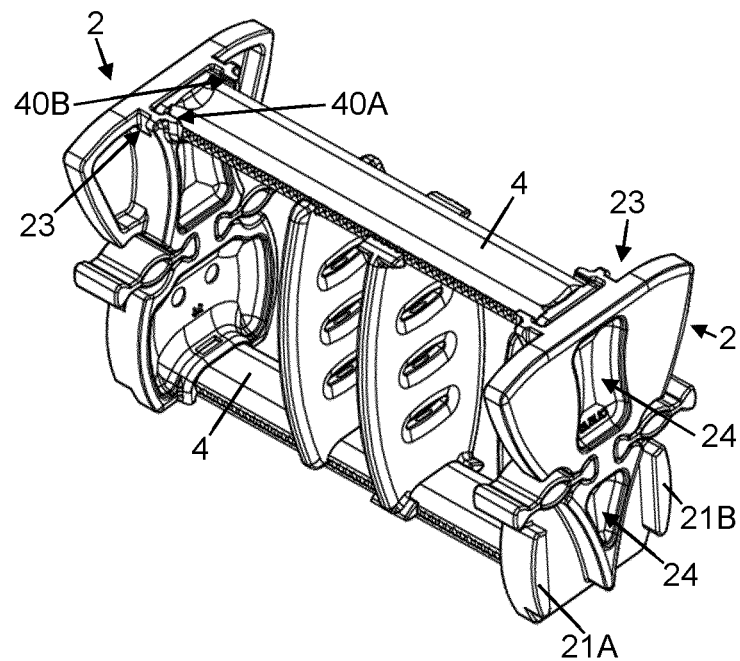
FIG.2C
FIG.2D

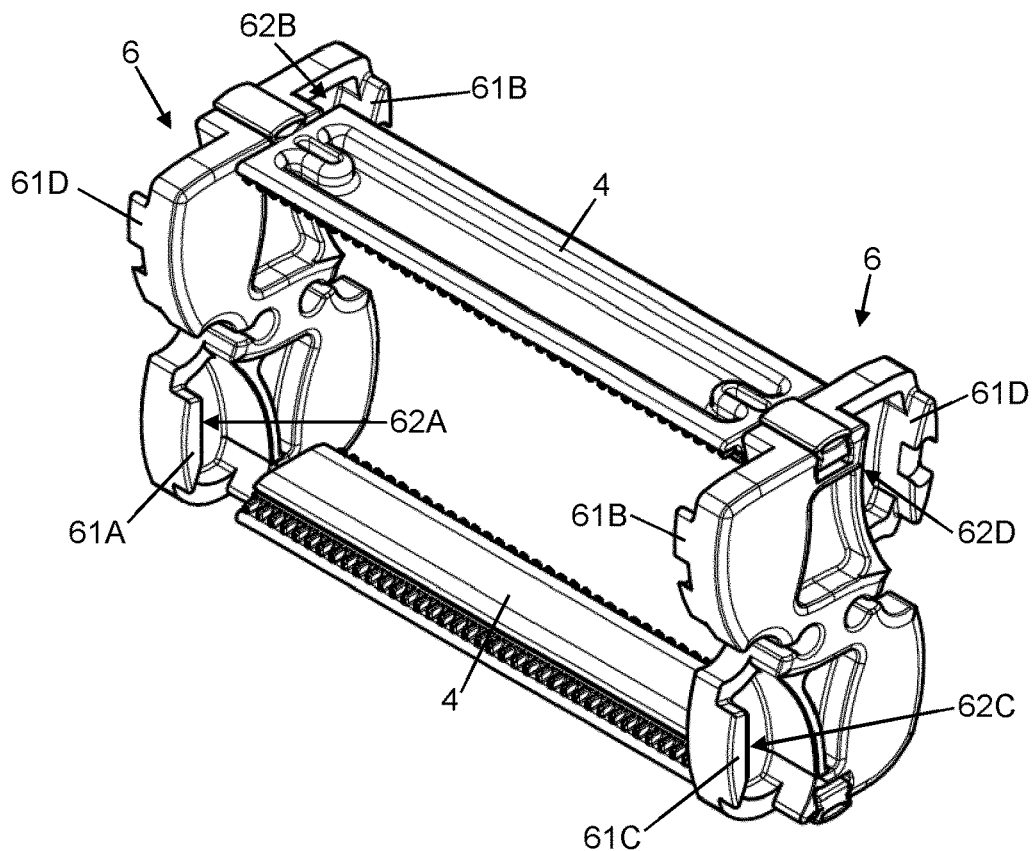
FIG.6A
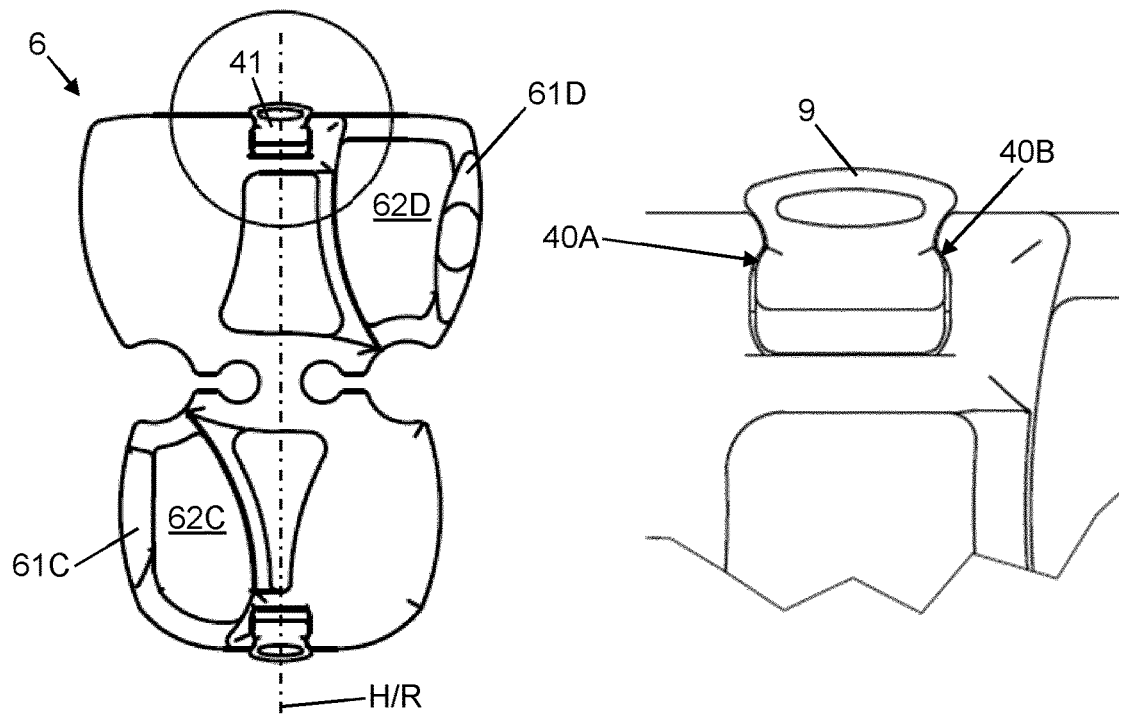
FIG.6B          FIG.6C

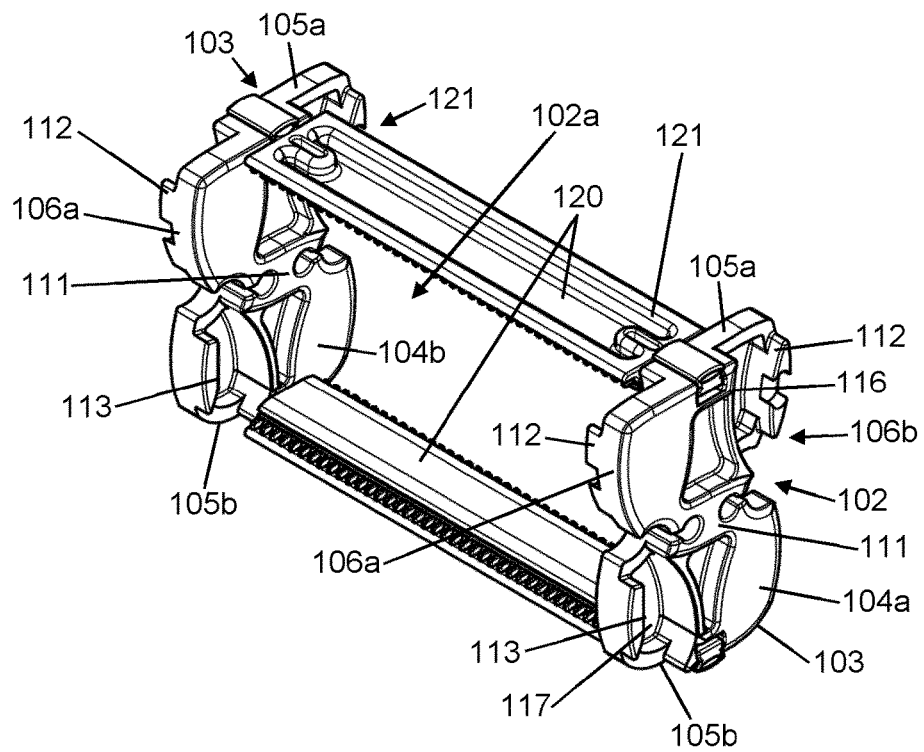
FIG.7A
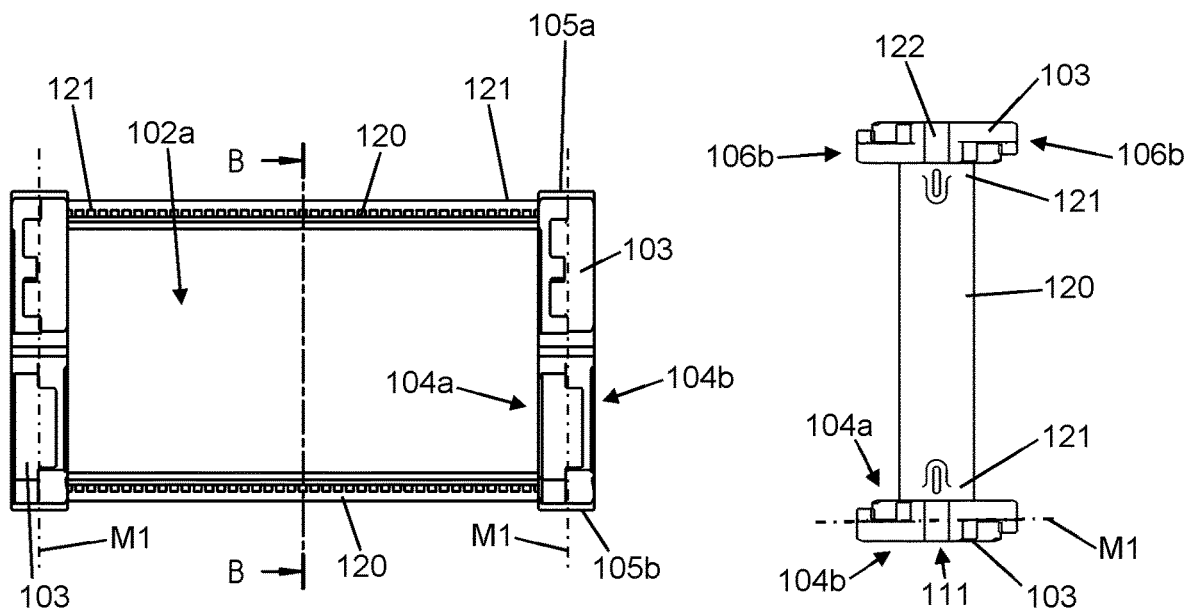
FIG.7B
FIG.7C

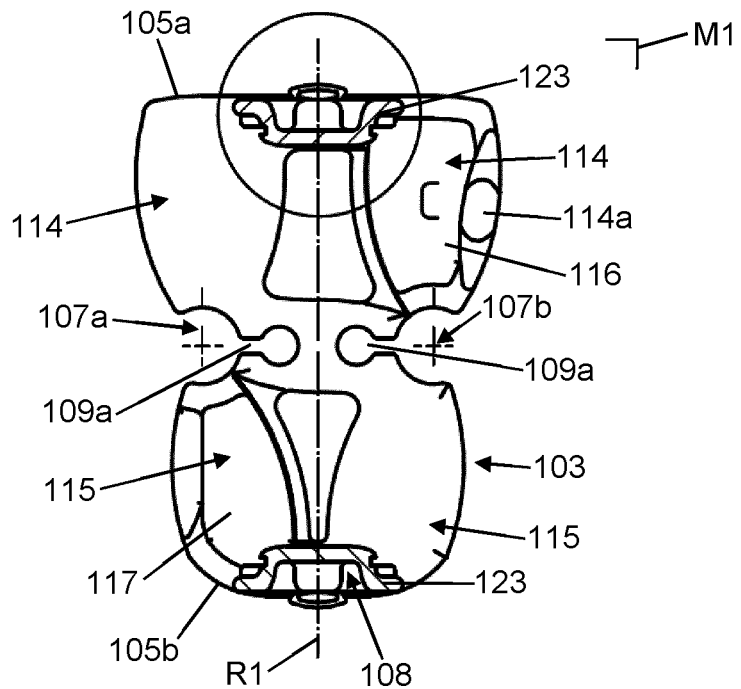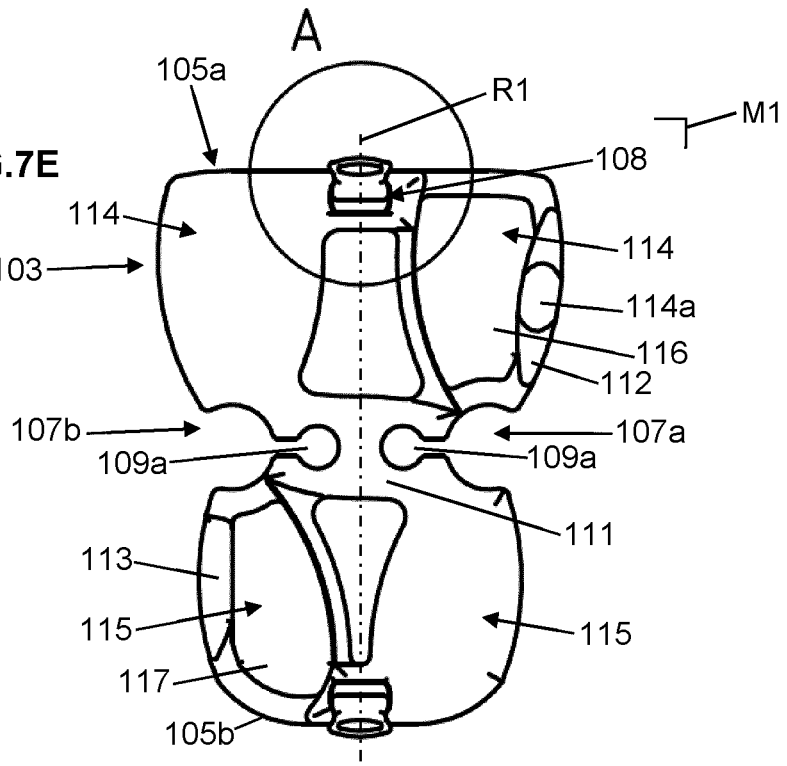

ENERGY GUIDE CHAIN WITH FLEXIBLE JOINT CONNECTORS AS WELL AS SIDE PLATES AND JOINT CONNECTORS FOR SAME

FIELD

The invention generally concerns the field of energy guide chains for guiding lines like for example cables, hoses or the like between two connecting locations of which at least one is moveable relative to the other. Energy guide chains serve typically for dynamic protective guidance of supply lines to a mobile consumer.

The invention concerns in particular energy guide chains in which the side plates are connected together by at least one elastic joint element which is appropriately flexible and can be angled relative to each other.

BACKGROUND

Energy guide chains having flexible joint connectors or joint elements which are elastically deformable in angular relationship in the direction of the side plates have already been proposed in WO 02/086349 A1 and since then have proved successful in the market. Substantial advantages of such energy guide chains of the general kind set forth are the low level of abrasive wear in operation, afforded by the avoidance of conventional joint/pin connections between the side plates, and a high level of running smoothness by virtue of the elastic action of the joint elements. In addition low-vibration displacement is also achieved in the rolling movement by virtue of the reduced polygon effect, in consideration of the possibility of comparatively short chain pitch division.

Energy guide chains of the general kind set forth are therefore suitable in particular for use in clean rooms, but not exclusively for that purpose.

Similar energy guide chains have also already been proposed in EP 1351362 A2 and in DE 10 2006 011 229 A1 and U.S. Pat. No. 7,204,075 B2, but there with joint connectors which are formed on the plates. The use of separate joint elements in accordance with WO 02/086349 A1 in comparison allows a more desirable selection of the respective plastic both for the plates and also for the joint element.

Typically in the above-mentioned known structures each plate line includes successive side plates which are connected together by means of at least one elastically bendable joint element and can be angled relative to each other. The plate lines are connected together by transverse bars at at least some mutually opposite side plates and are held in parallel relationship. The transverse bars and side plates delimit outwardly a receiving space for the lines to be guided.

It is further provided in the known energy guide chains that the side plates include on the one hand abutment surfaces which in the straight relative position of the side plates—in particular in the self-supporting upper run—and on the other hand further abutment surfaces which, in the completely angled relative position—in the direction-changing arc between the two runs of the energy guide chains—of the side plates bear against each other.

At least in the widely used structure in accordance with WO 02/086349 A1 it is provided for that purpose that laterally protruding projections of a side plate engage into corresponding recessed pockets in an adjacent side plate, wherein projections and pockets can cooperate in operative abutting relationship. That is effected in that, in the straight relative position, at least first abutment surfaces of the projections cooperate with first counterpart abutment surfaces of the pockets. In the completely angled relative position at least second abutment surfaces of the projections cooperate with corresponding second counterpart abutment surfaces of the pockets.

The design configuration of WO 02/086349 A1 has proven to be very good. A disadvantage however is that achieving a configuration of the energy guide chain, that is as straight-line as possible, in particular in the upper run, can be made difficult under some circumstances caused by manufacturing tolerances. This is due to the fact that two different side plates have to be used in the two mutually opposite plate lines, which are of a mirror-image symmetrical configuration relative to each other with respect to a longitudinal central plane (plane of displacement) of the energy guide chain. This therefore does not involve the same or identical side plates in both plate lines, but separately produced parts, in particular side plates which are produced in two mirror-image injection moulding moulds. That however can result in minor dimensional differences which can lead to unequal chain division in both lines and/or slightly differing abutment geometries.

To resolve that problem WO 2012/131033 A1 proposed a further development in which the side plates of the energy guide chain are in themselves of a symmetrical configuration at least with their abutment-operative surfaces. In that respect WO 2012/131033 A1 proposes the use of two different types of side plates in each plate line, wherein however side plates of the first type and the second type are respectively used in the same way, by virtue of their symmetry, in both plate lines. Differences caused by tolerances in the geometry or length of the two plate lines can thereby be reliably excluded and this results in the two runs always extending in a straight line.

The energy guide chain of WO 2012/131033 A1 is viewed as the most relevant state of the art. In practice it has been found that the design in accordance with WO 2012/131033 A1 is capable of being improved in respect of its lateral stability.

SUMMARY

Accordingly a first object of the present invention is to further develop energy guide chains of the general kind set forth and having elastically flexible joint elements, such that it is possible to provide that the chain runs extend as much as possible in a straight line and it is also possible to achieve a high level of lateral stability.

A second independent object of the present invention involves proposing a development in the flexible joint connector or joint element for energy guide chains of the general kind set forth, also irrespective of the design configuration of the side plates. That object is attained in accordance with a second independent aspect by a joint connector which can also advantageously be used in known energy guide chains from the state of the art.

First Aspect

The first-mentioned object is already attained in an energy guide chain of the general kind set forth having side plates which in themselves are functionally symmetrical, that is to say of a symmetrical configuration at least with their abutment-operative surfaces, in the simplest embodiment, in that each side plate has both two projections and also two pockets which can cooperate in particular in abutment-operative relationship with a respective adjacent side plate. In that case the two projections and the two pockets of the same side plate are arranged symmetrically in particular at the respective side plate. The symmetrical arrangement can be in particular of mirror-image symmetry relative to a heightwise plane, in particular a heightwise central plane of the side plate, or rotationally symmetrically relative to a heightwise axis, in particular a heightwise central axis of the side plate. In that way the combination comprising a per se symmetrical configuration of the functionally essential abutment surfaces together with suitably symmetrical provision of two projections and two pockets in a respective one and the same side plate is proposed. The pockets can be in the form of or referred to as recesses.

A considerable improvement in lateral stability can be achieved by that surprisingly simple measure without having to use in both side plate lines, plates which are to be manufactured separately and which are of mirror-image configuration relative to the longitudinal central plane of the chain, as for example is known from WO 02/086349 A1. The advantages already known from the symmetry of WO 2012/131033 A1 are additionally achieved. Besides enhanced lateral stability operational reliability is also increased as a break in or detachment of a joint connector cannot readily lead to a plate being disengaged from the line of plates. Using semi-continuous chain configurations or those with two types of plates also provides that the lateral stability and/or torsional strength of a plate line does not in itself have to be ensured primarily by the joint elements.

The projections engage into recessed abutment-operative pockets of an adjacent side plate in order in the straight relative position to cooperate at least by means of first abutment surfaces of the projections with first counterpart abutment surfaces of the pockets and in the completely angled position cooperate at least by means of second abutment surfaces of the projections with second counterpart abutment surfaces of the pockets.

Accordingly in accordance with the invention each side plate has both laterally projecting and abutment-operative projections, in particular with first and second abutment surfaces, and also corresponding pockets which are in abutment-operative relationship with corresponding first and second counterpart abutment surfaces.

Preferably at least in the straight relative position the abutment surfaces and/or counterpart abutment surfaces or abutments cooperate in such a way that they provide for at least almost play-free transmission of tensile and compressive forces in the longitudinal direction of the chain, which typically alternate in operation in the reciprocating movement. In that way the joint connector or the joint element can be substantially freed from the effect of tensile and/or compressive forces, which inter alia can have a positive effect on the service life of the chain.

Basically at least two alternative configurations are possible in accordance with the first aspect of the invention.

In a particularly preferred embodiment both plate lines as side plates have respectively different outer plates and inner plates, wherein structurally identical outer plates can be used in both mutually opposite lines and structurally identical inner plates can be used in both mutually opposite lines. In that case outer plates and inner plates alternate in the longitudinal direction of the chain.

In that particularly preferred embodiment both the inner plates and also the outer plates are respectively in themselves of a mirror-image symmetrical configuration in relation to the respective heightwise plane extending perpendicularly to the longitudinal direction, in particular the heightwise central plane, which extends perpendicularly to the longitudinal direction of the chain and at least substantially perpendicularly to the side plates, at least with their abutment-operative abutment surfaces, so that identical inner plates and identical outer plates can be used in both plate lines. In that case preferably each inner plate can include two projections and two pockets and each outer plate can include two projections and two pockets.

In regard to the designation of so-called outer plates and inner plates, it is to be noted that in the present invention they are basically interchangeable and in the present case based on a consideration as to which plate is disposed with the narrow sides which are the outer sides in the direction-changing region, at the outside or the inside. The designation adopted serves only to distinguish terminology and is not intended to involve any restriction in terms of protection. The terms outer plates and inner plates are here respectively interchangeable with plates of a first type and plates of a second type.

Particularly preferably one of the two plate sides or plate side surfaces of a plate has at least two pockets and the other of the two plate sides or plate side surfaces of the same plate has at least two projections.

Preferably at least one plate—preferably symmetrically relative to the heightwise plane—has at least two projections which preferably project laterally. In particular that at least one plate preferably has relative to a longitudinal plane through the joint connectors, that can be disposed centrally but does not have to be, in the heightwise region opposite the at least two projections, at least two pockets which are preferably in the form of depressions, recesses or the like.

Preferably adjacent pockets have the projections in different heightwise regions. Preferably adjacent plates have the pockets in different heightwise regions.

In a preferred embodiment in a first pocket and an adjacent pocket in a heightwise region a projection at a plate side or a plate side surface (for example the outside) of the first plate cooperates with a pocket on the other plate side or plate side surface (for example the inside) of the adjacent plate. Preferably in that case in the other heightwise region, a pocket at the other plate side or plate side surface (for example the inside) of the first plate and a projection on the other plate side or plate side surface (for example the outside) of the adjacent plate cooperate.

Preferably adjacent plates with their projections and pockets are so-to-speak of a crossed or interlaced configuration. Preferably in that way two adjacent plates are already held together, without joint connector or joint element—apart from any play between abutment surfaces—in respect of all translatory degrees of freedom, that is to say for example with respect to the longitudinal direction, the direction of the heightwise axis and the direction in which the transverse bars extend. In that way the operational reliability and possibly service life can be enhanced, besides increased lateral stability.

Preferably two adjacent plates are already fixed to each other without a joint connector or joint element in such a way that rotation about their respective heightwise axis relative to the respectively adjacent plate is blocked.

Preferably two adjacent plates are fixed to each other without a joint connector or joint element in such a way that relative rotation about an axis extending in the longitudinal direction of the chain—preferably perpendicularly to the heightwise central plane or heightwise plane of the plate—is possible relative to the respectively adjacent plate, but preferably only in precisely one direction of rotation, so that opposite relative rotation is blocked. That can provide for easy assembly with a high level of chain strength. If in that case the permitted direction of rotation is opposite in relation to plates arranged in adjacent plane lines at the same height, the torsional strength of the chain can be further improved.

In an alternative embodiment it is also possible to provide continuously successive structurally identical side plates in both plate lines. They are then rotationally symmetrical in themselves at least with their abutment-operative abutment surfaces, in relation to a heightwise axis which extends perpendicularly to the longitudinal direction of the chain and at least substantially parallel to the side plates, preferably in the central plane thereof. This embodiment can particularly provide that the rotationally symmetrical side plate has two projections which project away from the receiving space and two projections which project towards the receiving space and in addition also two abutment pockets which open towards the receiving space and two abutment pockets opening away from the receiving space.

Second Aspect

In addition to attain the second-mentioned object and also considered in itself as a further aspect essential to the invention, the invention also concerns a joint element or a joint connector.

A joint connector is distinguished according to the invention in that the cross-section of the fixing region is designed for a positively locking connection which is non-rotatable upon angular positioning or appropriate bending in the corresponding fixing receiving means and/or the fixing region at least at its end facing in the longitudinal direction has a flattened and/or curved contact surface. In that arrangement the contact surface can in particular have a radius of curvature which is markedly greater than half the largest cross-sectional dimension of the fixing region, in particular larger than the radius of a periphery at the cross-section of the fixing region.

The non-rotatable fixing avoids abrasion wear, which is advantageous in particular in clean room applications and generally enhances the service life.

The flattened and/or relatively flatly curved contact surface permits better transmission of force, in particular compressive or thrust forces, to the joint element, so that it can also be used for more extensive damping upon transition into the straight position, that is to say in particular for reducing noise to a greater extent, and/or can promote or implement preloading in the straight run. Both actions are particularly advantageous in combination with the divided configuration of the bendable central joint region which has two mutually oppositely outwardly curved material regions with a hollow space which is disposed therebetween and is open at both sides.

The divided central joint region can afford particular suitability on the part of the joint element or joint connector for uses in energy guide chains in which the joint element or the joint connector is at least at times and recurringly compressed. Compression can be accommodated by an increase in the spacing of the two oppositely outwardly curved material regions. Compression can be accommodated in particular without the action of a torque on the fixing regions or any transitional regions adjoining same.

The divided central joint region can provide particular suitability for the joint element or joint connector to durably withstand torsional loadings, for example about an axis perpendicular to the heightwise plane of an energy guide chain or about an axis in the longitudinal direction of the joint element or joint connector.

It has been found that the reduction in tensile strength of the joint element or joint connector, which is involved with the divided central joint region, is substantially harmless, in particular in an energy guide chain in which at least in the straight relative position the abutment surfaces and/or counterpart abutment surfaces or abutments cooperate in such a way that they provide for accommodating the tensile forces in the longitudinal direction of the chain and the transmission thereof directly from one side plate to the next one. In that way the joint element or joint connector can be substantially relieved of tensile forces in operation thereof.

In the case of the joint connector the cross-section of the fixing region is preferably of a substantially trilobular or approximately triangular configuration. The body of the joint connector can have in particular a plate-like transitional region between each fixing region and the divided central joint region.

Preferably the joint connector is made in one piece from plastic, in particular a flexurally resilient plastic.

Preferred developments of the joint connector are described hereinbefore and hereinafter.

Third Aspect

The invention further concerns a side part for forming an energy guide chain and a method of producing an energy guide chain.

Energy guide chains are known for example from WO 2014/161763 A1 or WO 02/086349 A1 and are used for many situations. In that case the energy guide chains have lines of side plates which for example are in the form of alternate inner and outer plates, which however suffers from the disadvantage that various tools like for example injection moulding tools have to be used to form the inner plates and the outer plates of a line thereof so that the manufacturing costs are comparatively high. On the other hand the two lines of plates can also be respectively assembled from only one type of plate so that therefore each line of plates respectively comprises plates of the same structure, but the plates of the two lines are provided in mirror-image relationship with each other in relation to a mirror plane which extends in the centre of the energy guide chain and parallel to the two side surfaces of the plates. Here too different tools like for example injection moulding tools are required for manufacturing the plates.

In addition it has been found that there is a further problem that when the plates of the two lines are produced jointly with different tools, by virtue of production tolerances which always occur, the two lines of plates are not of exactly the same dimensions, apart from the plane of symmetry thereof. Thus those production tolerances add up over a plate line portion comprising a plurality of plates so that the lines of plates differ in length slightly but nonetheless significantly. That could be compensated by a clearance in the joint connections between adjacent plates of a line, but such a joint clearance is unwanted as that leads to increased abrasive wear, poorer running properties upon displacement of the energy guide chain and the like. If such joint clearance is avoided then those slight differences in length of the lines of plates have the result that, upon displacement of the energy guide chain, that leads to a slight generally lateral offset upon a displacement movement of the energy guide chain, which in itself is in a straight line. That however worsens the running properties of the chain and results in increased abrasion and wear of the chain links, in particular the joint connections. That problem is intensified if the respective energy guide chain is to be operated for example under clean room conditions or at high speeds of displacement.

Therefore a further independent third object of the invention is to provide an energy guide chain of the general kind set forth, which in the displacement movement of the energy guide chain has improved running properties, in particular in regard to a lateral offset of the chain that is to be avoided in the displacement movement thereof and involves less wear and which is of a particularly simple structural configuration and which is preferably suitable for use in clean room conditions.

According to this third further variant of the invention the energy guide chain is of such a configuration that extending continuously over a chain portion which includes at least more than three adjacent chain links and which includes the at least two or all of the plate lines the plate lines are overall made up continuously from structurally identical plates (hereinafter also referred to as the "chain portion") so that the respective plate can be arranged selectively at any position at each of the various lines of the chain portion. The chain according to the invention in particular in this further variant has excellent running properties and further reduced wear and is also suitable for operation under clean room conditions at high speeds of displacement, as well as being particularly simple and inexpensive to manufacture.

By virtue of the use according to the invention in this further variant of plates of identical structure throughout in a plurality of or all the plate lines of the chain portion all the plates of the chain portion can be fitted selectively in one of the above-mentioned at least two or all plate lines of the energy guide chain at any position in the respective line. Further preferably all of the plates of the chain portion can be manufactured in one and the same shaping tool, in particular an injection moulding tool. In this respect the expression "can be used selectively" means that, by virtue of the arrangement of the respective plate in the one line or the other of the chain, this does not influence the structure of the chain and/or its dimensions and/or its functionality, which also applies in regard to the respective position within the plate line. Manufacture is thus particularly inexpensive for the plates. The plates in this case are preferably plastic components, in particular plastic injection mouldings, which enjoy the advantages according to the invention in a particular fashion also by virtue of the shrinkage properties of the plastic components upon manufacture thereof.

There is also the advantage that the plate lines or the energy guide chain (hereinafter also referred to simply as the "chain") can be more easily assembled as in that case it is no longer necessary to ensure that the respective plate is to be arranged in the one or the other plate line of the chain or in a given position within same. That also makes component handling and storage of the plates easier. That can apply overall for example for manual or also automated assembly of the chain links or the chain.

In addition the running properties of the chain are more uniform thereby, having regard also to avoiding lateral offset of the chain upon the displacement movement thereof, and wear in the joint connections in the movement of the chain is reduced. The "lateral offset" of the chain makes itself noticeable by virtue of the fact that, upon a displacement of the chain, for example in a straight line, slight transverse forces act on the chain entrainment means of a moveable connecting point at which the end of the chain is fixed, and those transverse forces would not occur in a theoretical ideal chain. On the other hand the lateral displacement can have the result that, in the displacement of the chain, it deviates from the target position of the path of displacement. That is avoided by all plates of the chain portion in accordance with the invention in this further variant being of the same structure, whereby production and/or fitment tolerances which would occur to a greater degree when using different plates in the chain portion are minimised and also deviations in length of the various lines of plates from the target length are less. In addition in the case of that straight line displacement movement, slight transverse forces, therefore forces which are transverse relative to the direction of displacement, also act on chain links arranged in the central region of the chain.

The advantages according to the invention in particular in this further variant are afforded to a particular extent if the fixing means of the plates for transverse bars and/or abutments of the plates and/or joint connections, in particular also the joint elements, are formed in one piece on the plates. Preferably the fixing means of the plates for transverse bars and the abutments of the plates are formed in one piece on the plates. In that way the various chain links enjoy a particularly high level of dimensional accuracy, which also relates in particular to the dimensional and fitting accuracy of the connections of various components like plate and transverse bar or the joint connections and the cooperation thereof like for example the abutments, and also involves the relationship of the dimensional accuracy as between plates and chain links relative to each other. That also results in particularly uniform stability and configuration of the various chain links of the chain portion, thereby affording the advantages according to the invention in particular in this further variant to a particular extent.

Preferably the respective abutment, and this applies particularly preferably to all abutments of the respective plate, has a formation region on the respective plate, preferably an extension thereof, wherein the free end of the abutment, that is opposite to the formation region, is not covered over by another region of the respective plate, which is permanently fixed to the plate and thus can only be removed from the plate with destruction thereof, as applies to another plate region formed in one piece on the plate. Preferably the fact that the free end of the abutment is not covered over as indicated above also applies to other regions which are provided on the plate releasably or variably in position. The structurally identical plates with the abutments preferably formed in one piece thereon can thereby be easily assembled to form a plate line.

The chain is preferably arranged or can generally be arranged to form at least two runs like an upper run and a lower run and a direction-changing region between two respective runs. The end regions of the chain are preferably displaceable with two connecting locations which are moveable relative to each other, thereby forming the at least two runs which are or can be connected to a respective connection location. The chain is preferably displaceable in a straight line, that is to say along a straight path of displacement.

The above-mentioned reduction in tolerances by virtue of the structurally identical plates according to the invention in this further variant is also afforded when connecting the various components of the chain links together, for example connecting a plate and a transverse bar or a plate and a joint element or when moving adjacent plates relative to each other in the displacement movement of the chain, for example in relation to cooperating abutments of adjacent links or when plate portions of adjacent plates are guided past each other in the displacement movement, like for example plate extensions which for example project from a central plate region in the plate direction. It has been found in the context of the invention in particular in this further variant that upon the displacement movement of the chain the various tolerances in the fixing region of the plates to the transverse bars, the cooperation of adjacent abutments and the constitution of the joint connections interact and cooperate with each other to be able to provide an optimum chain in respect of running properties, in particular offset upon displacement, abrasion wear and thus service life of the chain.

The chain portion having a plurality of adjacent chain links according this further variant, that is made up continuously of mutually structurally identical plates, therefore continuously with such structurally identical plates, can extend over ≥5, preferably ≥10 or ≥50 plates or chain links occurring in succession in the longitudinal direction of the chain, particularly preferably over the entire length of the respective plate line of the energy guide chain.

The said chain portion comprising mutually structurally identical plates includes the at least two or more or all of the plate lines of the energy guide chain. In the above-mentioned chain portion the plate lines extend in the longitudinal direction of the chain, preferably in mutually juxtaposed and/or mutually parallel relationship. Preferably a plurality of or all plate lines of the chain portion are connected together by at least one or more transverse bars, and this preferably also applies to chain lines which are respectively arranged in mutually juxtaposed paired relationship. Plates in the chain portion, that are arranged mutually opposite in adjacent plate lines are or can be releasably connected together by at least one or preferably two or optionally more than two transverse bars, which preferably applies to all plates of the chain portion. The plates which are connected together by at least one and preferably at least two transverse bars and which are arranged in the adjacent or different plate lines respectively form a chain link. The above-mentioned chain portion preferably includes ≥5 or particularly preferably ≥10 or ≥50 chain links in succession in the longitudinal direction of the chain or all chain links of the chain. Preferably each chain link of the chain portion therefore has at least one transverse bar which is connected at its two ends, preferably releasably, to plates, wherein those plates are part of the chain portion.

The respective plate line or line of chain links of the chain is generally provided at its two end regions with end fixing parts which can be in the form of plates or links. Those end fixing parts can have fixing means in order to secure the respective line of plates or links to a connection point, wherein at least one or both of the connection points is moveable and often one of the two connection points in stationary. Those end fixing parts or end members can also have strain relief means for strain-relief fixing of the lines guided in the chain. It will be appreciated that those end fixing parts or end links of the line of plates or chain links are not part of said chain portion having structurally identical plates. Those end fixing parts or end links can however be part of the energy guide chain according to the invention, in particular in this further variant. The chain portion according to the invention with structurally identical plates can therefore extend completely between the end links or end fixing parts of the chain, that are disposed at mutually opposite end of the chain.

The fact that the chain lines are "overall" made up of mutually structurally identical plates means in accordance with the invention according to this further variant that all of the at least two or more than two plate lines which the chain portion includes, preferably all of the plate lines of the chain that extend along the chain portion, are built up from structurally identical plates.

The point that the plate lines are made up "continuously" from mutually structurally identical plates means in accordance with the invention according to this further variant that in relation to the portion of the respective plate line, that is part of said chain portion, all of the plates which occur in succession in the longitudinal direction of the plate line are of mutually identical structural configuration.

Preferably the plates at both opposite narrow sides of the plates have fixing means for releasably fixing the transverse bars (referred to as "fixing means"), wherein the fixing means of the respective plate for the transverse bar or bars are preferably of a structurally identical configuration at both narrow sides thereof and are preferably respectively formed in one piece on the plate. Assembly of the chain links is simplified thereby and by virtue of the one-piece and structurally identical plates according to this further variant of the invention with the transverse bar fixing means that affords the above-mentioned advantages according to the invention like improved running properties of the chain. The plates are thereby preferably designed in such a way as to be selectively suitable for fitment in various lines of the chain. The fixing means of the plate are preferably arranged in the cross-sectional region of the respective plate between the two side surfaces thereof. Fixing means projecting laterally from the side surfaces of the plate or other regions projecting laterally therefrom are avoided or preferably do not occur. That makes it easier to use structurally identical plates in the plate lines. In addition the enveloping volume of the plates is reduced and thus storage thereof is facilitated.

Preferably the plate fixing means for the at least one transverse bar are arranged in the region of or at at least one or both of the plate narrow sides and are of such a configuration that the transverse bar can be fixed to the plate projecting selectively from the inner plate side or from the outer plate side. In that way structurally identical plates can be arranged in the chain portion selectively in one of the plate lines. When two plate lines are arranged adjacent to a plate line then the plates of the central line can be selectively connected with the respective structurally identical transverse bars to one of the adjacent plate lines.

Preferably the fixing means of the plates for the transverse bars are in the central plane of the plates. That substantially simplifies building up the plate lines of the chain portion by using structurally identical plates according to this further variant of the invention so that in that respect there is no need to attend to the orientation of the plate in the respective line. Furthermore in that way forces acting on the transverse bars, for example in the displacement movement of the chain, lines guided thereby come to bear with the transverse bars, and the corresponding forces are transmitted from the transverse bar into the central plane of the plate so that the joint connections between the plates are also more uniformly stressed, whereby the smoothness of movement of the chain is improved and/or wear or material fatigue of the joint connections is reduced. The central plane of the plate preferably extends parallel to the two side surfaces of the plates and is preferably at the same respective spacing relative thereto. Alternatively or in addition the plate central plane can be so arranged that the extensions which are arranged at the thickness region of the respective plate and project from that region in the longitudinal direction of the plate and/or the abutments provided on the plates for cooperating with adjacent plates to delimit the hinged movement thereof relative to each other are arranged at the same lateral spacing relative to the plate central plane or particularly preferably adjoin that plane.

Preferably the transverse bars are fixed to the plates by means of latching and/or clamping connections so that the fixing means of the plates for the transverse bars can be permanently fixed to the plates in a particularly simple fashion, in particular they can be formed in one piece thereon, whereby the plates can be easily manufactured and the chain links can be easily assembled. The plate fixing regions for the transverse bars and the two transverse bar end regions have clamping and/or latching means corresponding thereto. The clamping and/or latching means are preferably arranged in a receiving groove and/or clamping receiving means for a transverse bar end region which has the corresponding clamping and/or latching means, wherein the receiving groove and/or clamping receiving means of the plate is preferably arranged at one or both narrow sides thereof.

The two fixing regions at the end regions of the transverse bars for connection to the plates are preferably of a structurally identical configuration and are preferably formed in one piece on the transverse bars whereby separate fixing means like screws or the like for fixing the transverse bars to the plates are unnecessary but can possibly be provided. Such separate fixing means also make assembly and dismantling of the transverse bars more difficult and can also be lost in that operation. Both end regions of the transverse bars can be releasably fixed to the plates. In the state of being secured to the respective plate the transverse bars are preferably not pivotable with respect to the plate, and that increases the stability of the chain link and reduces abrasion wear when loosening or opening the transverse bars. That applies in particular for narrow plates, that is to say a short length thereof in the longitudinal direction of the chain, which reduces the amount of space required in the fixing region of the transverse bars on the plates, but permits tighter direction-changing regions, that is to say smaller radii of curvature, which is of significance for many situations of use. Optionally however such pivotability can be afforded. In general an intermediate portion can possibly also be arranged between the transverse bar fixing region and the plate fixing region, for example to make it easier to produce a clamping connection between them. The intermediate portion however is preferably of such a configuration that upon dismantling of the transverse bar it remains appropriately on the transverse bar or the plate and thus in that case is not involved as a separate component or has to be handled as such.

Preferably the plate at the two plate end regions which are arranged in the longitudinal direction of the respective line of plates respectively has at least one or precisely one joint connection so that same is or can be hingedly connected to a respective plate adjacent in the longitudinal direction of the line of plates. The respective joint connection of the plate can serve as a receiving means for a separate joint element. The receiving means is preferably of such a configuration that the joint element is arranged in the receiving means in force-locking and/or positively locking relationship and/or in material-bonded relationship and is captively held therein. The joint element is preferably arranged in the receiving means in such a way as to carry a tensile force in the longitudinal direction of the chain or is generally held to the plate to carry a tensile force. The joint element can have at least two connecting regions which, when the joint element is arranged on the line of plates, are spaced from each other in the longitudinal direction of the line of plates, wherein a respective connection region of the joint element is coupled to one of the two plates adjacent in the longitudinal direction of the plate line to form the joint connection. The respective joint element can also be permanently fixed to the plate, for example by adhesive, or preferably formed on the plate in one piece, for example in an injection moulding method or in a two-component injection moulding method, thereby affording the advantages according to the invention in a particular fashion. Generally in accordance with the invention the material of the joint element can be different from the material of the plate or the thickness region of the plate. Therefore at least one joint element can be arranged at an end region of the plate in relation to the longitudinal direction of the chain and at least one receiving means for the joint element of the adjacent plate can be provided at the other plate end region in relation to the longitudinal direction of the chain, where optionally there can also be provided at a plate end region both a joint element and a joint receiving means for coupling to the joint element and receiving the respectively adjacent plate. It is possible to provide at an end region of the plate in relation to the longitudinal direction of the chain only at least one or more joint elements while it is possible to arrange at the other plate end region in the longitudinal direction of the plate only at least one or more receiving means for the joint element or elements of the adjacent plate. Optionally joint elements can also be provided at both end regions of the plate so that, for connecting adjacent plates, the joint element of a plate or the joint element of the respective plate, that is arranged at an end region, can be hingedly connected to the joint element of the adjacent plate or the joint element at the opposite end region of the respective plate, and preferably can also be connected to carry a tensile force in the longitudinal direction of the chain. Respective adjacent plates are hingedly connected together preferably only by a joint connection, possibly also by a plurality of joint connections. The respective receiving means of the plate for the joint element is preferably permanently fixed to the body of the plate or is formed in one piece thereon and/or is machined out of the material of the body of the plate to provide a one-piece connection to the body of the plate whereby the advantages according to the invention are afforded in a particular fashion, in particular also in relation to running smoothness and abrasive wear upon displacement of the chain.

The configuration according to the invention of the joint connection is particularly advantageous in combination with the configuration according to the invention of the plate fixing means for the transverse bars and/or the plate abutments, in particular according to this further variant of the invention. By virtue of the structurally identical configuration of the transverse bar fixing means in their overall configuration adjacent chain members involve particularly small manufacturing and fitment tolerances, in particular also with respect to the length of the plates in the longitudinal direction of the chain and also with respect to the spacing of the transverse bar fixing means in relation to the plate height, wherein the plate height represents the spacing of the two plate narrow sides perpendicularly to the longitudinal direction of the chain. By virtue of the particularly exact design configuration of the chain links the joint connections are mechanically less heavily loaded in the displacement movement of the energy guide chain, and that results in lower loadings and fatigue phenomena at the joint elements.

Preferably the plates and joint connections and/or joint elements are of such a configuration that the joint connections and/or joint elements experience deformation in the displacement movement of the chain, preferably deformation like flexural and/or torsional deformation and/or stretching in length. Flexural deformation is preferred by virtue of the force transmission between the plates in the joint movement of the plates. The joint element may also experience at least substantially no stretching in length in the joint movement. The joint element in that case can be elastically bendable or optionally also plastically bendable or flexurally stiff. Upon elastic deformation of the joint element by virtue of the joint movement it can exert a return force in a direction towards the initial position of the plates. The chain is thereby particularly suitable for clean room conditions. Hole-pin connections which lead to increased abrasion are avoided in that way.

Preferably the joint connections of the plates are arranged at the ends thereof. In that way the plates can be particularly easily fitted selectively in different lines of plates. In that case the end of the plate can also represent the end of the thickened or central region of the plate, from which at least one or more extensions project in the longitudinal direction of the plate. The end joint connections can each have a receiving means for a joint element of an adjacent plate or a joint element. The joint elements can be of the width of the plates or the thickened or central region thereof or also can be of a smaller width like for example smaller than or equal to half the plate width so that it is possible to provide at a joint connection between adjacent plates two joint elements which can be respectively fixed to one of the two plates according to this further variant of the invention before the structurally identical plates are assembled together.

The joint connections of the plates can possibly also be provided on extensions of the plates which laterally overlap each other in respect of the plates adjacent in the line of plates and they can be arranged at the thickened or central region of the respective plate. By way of example it is possible for that purpose to provide at the respective plate extension at least one or a plurality of laterally projecting joint elements which for example project in the longitudinal direction of the transverse bar from the respective plate. The overlapping joint region of the adjacent receiving means can have a corresponding receiving means for that joint element. It is also possible to provide on both plate extensions joint elements which are or can be connected together to constitute the joint connection. It is also possible to provide adjacent to the joint element on a plate extension a receiving means for the joint element of the laterally overlapping extension of the adjacent plate for constituting the joint connection, wherein the joint elements are preferably deformable or elastically deformable, possibly also preferably elastically variable in length, in order to be able to engage into the receiving means of the extension of the adjacent plate, so that the plates according to this further variant of the invention can also be rotationally symmetrical, as described hereinafter. Such a joint connection can act for example in the manner of a torsion joint without being restricted thereto. The joint elements can be respectively permanently fixed to the plates or can preferably be formed in one piece thereon.

With the arrangement of structurally identical plates according to the invention according to this further variant the abutments of the plates for cooperating with the abutments of adjacent plates are also of identical structure and the plates are of an identical structure in regard to the configuration and arrangement of the abutments. In that way the respective plate according to this further variant of the invention with the abutments in said chain portion can be arranged selectively in one of the at least two plate lines. By virtue of the structurally identical configuration of the abutments of the plates of different lines according to this further variant production tolerances of the plates are reduced, which leads to increased running smoothness and low material fatigue for the chain links and the joint regions thereof, in which case the plates are also of a structurally simple configuration. That also has a particular advantage in relation to the interaction of the abutments with the joint connections and/or the fixing of the transverse bars to the plates. When the abutments of adjacent plates impact against each other, limiting the joint movement, forces are exerted on the plates and the chain links overall, and those forces also act on the joint connections and the fixing regions of the plates to the transverse bars. When the abutments of adjacent plates impact against each other therefore on the one hand there are rebound forces, while on the other hand, if the abutments are not of an exact configuration and/or are not exactly positioned on the respective bar, that can involve a certain offset in respect of the two plates provided with the abutments. That can result in increased loading on the joint connections and/or the fixing means of the plates for the transverse bars and material fatigue and can impair smooth running of the chain. The structurally identical configuration of the abutments on the plates according to this further variant which can thus be selectively arranged in one of the at least two lines of plates minimises such disadvantages, in particular by improved error tolerances.

Preferably the abutments meet each other, preferably directly, in limiting the joint movement, for example limiting the pivotal movement The abutments of the plates can each be at least partially arranged at or in the region of the thickened part of the respective plate and/or on plate extensions which extend away from the thickened or central region of the plate in the direction of the plates or the chain. The abutment on a first plate can in that case engage into a recess in the extension of the respectively adjacent plate. That recess can preferably also be referred to as a pocket or abutment pocket.

Preferably the plate side surfaces are oriented in mutually parallel relationship. Preferably for that purpose alternatively or additionally the inner and the outer plate side surfaces are flat and particularly preferably smooth, that is to say have no projecting regions, which however includes the fact that recesses can be provided on the side surfaces. Preferably for that purpose alternatively or additionally the fixing means of the plates for the at least one or all transverse bars, the joint connections for pivotably connecting adjacent plates and the abutments for delimiting the joint movement of adjacent plates are arranged completely between the plate side surfaces and therefore do not project therefrom into the receiving space for the line or lines. Preferably the abovementioned features are all implemented in combination with each other. By virtue of the flat smooth side surfaces on the one hand the lines are handled particularly carefully in the displacement movement of the chain when they come into contact with the side surfaces, and that increases their service life and reduces abrasive wear. In that way the line of plates has a continuously flat inside or outside at least substantially over its length. On the other hand the plates in the form of plate-shaped components can be stacked easily and with a given number of plates, involving a low stack height, with the respective side surfaces bearing against each other. The reduced stack volume reduces the amount of space for storage of the plates generally, but in particular also in a magazine in which the plates are stored for assembly of the chain, for example upon automated chain assembly using robots or machines. As a result the plates can also be particularly easily separated from the storage stack or magazine, and that facilitates reliable and rapid assembly of the chain.

Preferably the chain links of said chain portion or the energy guide chain are all constructed only by the plates, transverse bars and possibly separate joint elements so that accordingly all fixing means for said components are preferably formed in one piece on the respectively corresponding components and there are preferably no further fixing means. Particularly preferably the joint elements are permanently connected to the plates or formed in one piece thereon. Intermediate portions can optionally be arranged between the transverse bar fixing regions and the plate fixing regions for the transverse bars, as described, or such intermediate portions are not present. Constructing the chain from the individual components is thereby substantially simplified and any manufacturing and/or fitment tolerances between the components are reduced, which improves the running properties of the chain in the displacement movement thereof and reduces material fatigue.

Preferably the plates are of such a configuration that the central region of the respective plate in relation to the longitudinal extent thereof is in the form of a thickened region which determines or substantially also determines the width of the plate. The thickened region therefore represents the respective central region of the plate in relation to its longitudinal extent, that is to say the dimension thereof in the longitudinal direction of the line of plates. Preferably, provided at that thickened region of the plate are the fixing means for the plate for fixing the at least one or more transverse bars to the plate which here can be of a particularly stable nature. Preferably extensions which extend in the longitudinal direction of the plate extend from the thickened region of the plate and can be at least substantially of a plate-shaped configuration. The side surface of the respective extension, that faces away from the plate central plane, can be a respective part of a side surface of the respective plate. In that case the thickened region is of a greater thickness or material dimension than the extensions. The joint connection is preferably spaced in relation to the height of the plate, that is to say with respect to the spacing of the two mutually opposite narrow sides, from both narrow sides of the plate, preferably arranged in the central heightwise region of the plate. Optionally however the joint connection can also be arranged in the region of one of the narrow sides of the plate. The extensions can be arranged at the respective plate end region on both sides of the respective joint connection, with respect to the respectively defined position of the plate of one of the plate extensions "above" and the other plate extension "below" the joint connection. In the given position of the plate with respect to the two plate end regions, in relation to the extensions arranged above the joint region, one thereof can be arranged at the plate inside or at the inner plate side surface and the other at the outer plate side or outer plate side surface. That can correspondingly also apply to the plate extensions arranged above the plate end region, in which case at one end region one of the extensions is arranged at the inner or first plate side surface and the other extension is arranged at the outer or second plate side surface so that adjacent plates are so-to-speak interlaced with their extensions. Alternatively the plate extensions at the two plate end regions can respectively also extend over at least substantially the total height of the plate and at the one plate end region the plate extension can be arranged at the inner plate side surface while at the opposite plate end region the plate extension can be arranged at the outer plate side surface so that this gives a so-called cranked plate. The extensions at the two mutually facing plate end regions of the two adjacent plates with the plates cranked or interlaced with each other laterally engage over each other when the plate is arranged in the line of plates. The abutments on the plates for delimiting the joint movement with respect to an adjacent plate are preferably arranged at least partially or completely at the described plate extensions, wherein preferably a projection of a plate, that projects laterally from a plate extension, engages into a recess in an extension of an adjacent plate. The term "projecting" is used generally in the sense of "sticking out". With mutually interlaced plates the line of plates has particularly high stability in relation to forces transversely to the line of plates and the chain therefore has good running properties. Cranked or interlaced plates of that kind are particularly suitable in this further variant of the invention as structurally identical plates for constructing different lines of plates of a chain portion or constituting corresponding lines of plates thereof.

Preferably the structurally identical plates in this further variant of the invention of the chain portion are of such a configuration that plates which are in mutually opposite relationship in adjacent lines of plates can be imaged on to each other by translative displacement. This means that plates arranged adjacently in the adjacent lines of plates only differ from each other by the translative displacement and otherwise involve the same orientation or direction in the line of plates to adjacent plates and the respective plate or the structurally identical plates of the chain portion are of a suitable configuration for that purpose. That can apply to all plates of the chain portion. As a result the chain portion in this further variant can be particularly easily built up by using structurally identical plates and the lines of plates can be particularly easily assembled. The mutually juxtaposed lines of plates in the further variant are thus of the same structural configuration and involve the same orientation in the chain. That gives the advantages according to the invention in the further variant in a particularly striking fashion.

Preferably the structurally identical plates in the further variant of the chain portion are of such a configuration that the plates in themselves are rotationally symmetrical, more specifically in such a way that the respective plate, with rotation—through preferably 180°—about an axis which extends perpendicularly to the longitudinal direction of the plate and at least substantially parallel to the plate side surfaces and which preferably extends in the central plane of the plate can be imaged on to itself. The mutually opposite plates in adjacent lines of plates can in that case be so arranged that, starting from a plate of a line, the opposite plate of the adjacent line is arranged turned through 180° about the axis of rotation. On the one hand the line of plates can be particularly easily constructed in that way as, when the line of plates is assembled from the plates, there is no need to look at the orientation thereof in relation to the plane of rotation. In addition the adjacent line of plates can also be particularly easily constructed as here it is also not necessary to attend to the rotational orientation of the respective plates. Construction of the entire chain is thereby substantially simplified, in particular even if it includes more than two lines of plates.

The configuration of the plates whereby they can be imaged on to each other by translative displacement and/or are of a rotationally symmetrical configuration relates in each case in particular also to the configuration of the fixing means of the plates for the at least one or more transverse bars, the joint connections for pivotable connection of adjacent plates to each other and the abutments of the plates for delimiting the joint movement of adjacent plates. The advantages of the invention are thereby afforded in a particular fashion. Optionally other structural features of the plates can be arranged differently from the above-mentioned translative imaging and/or rotational symmetry of the plates, like for example the arrangement of damping elements or regions of the plates which do not impair the functionality of the plates. Preferably the translative imaging capability and/or rotational symmetry of the plates concerns however the respective plate in its entirety so that according to the further variant for example all plates of the chain portion can be or are produced in the same shaping tool like for example an injection moulding tool.

Preferably the plates have damping elements which are adapted for abutment damping upon abutment of adjacent plates of a line thereof against each other. The damping element or elements of the respective plate can in that case have for example elastically deformable regions. The damping elements can be for example compressible, like for example in the manner of a foam or they can be deformable like in the manner of a spring tongue without being restricted thereto. The damping elements on the plates are preferably of such a configuration and arrangement that in accordance with the invention the respective plate can be used selectively in one of the different lines of plates of the chain.

A particularly advantageous embodiment in the further variant of an energy guide chain according to the invention has at least three or more lines of plates which extend in the longitudinal direction of the chain and which are in lateral mutually spaced relationship, wherein the chain portion with overall continuously structurally identical plates extends over the at least three or all of the adjacent lines of plates. The three or more lines of plates are thus made up exclusively from structurally identical plates. In regard to the configuration of the plates attention is directed to the foregoing description relating to this invention. In this respect the advantages according to the invention are afforded in a particular fashion as, with three or more lines of plates, deviations in the dimensional discrepancies of the plates of a line of plates have effects in relation to the running smoothness of a next but one or further away line of plates as the movement of the plates of a line thereof can also be transmitted by way of the transverse bars connecting the lines to the next but one line and so forth but the respectively adjacent line cannot compensate for the corresponding forces by virtue of the dimensional discrepancy by deformation of the chain, which is being prevented by the line which is further away. The use of structurally identical plates according to the further variant of the invention in the three or more lines is thus particularly advantageous.

In this respect therefore there is in each case also provided a central line of plates, referred to as the "second line of plates", at which there is provided on both sides a respective other line of plates, referred to as the "first line of plates" or the "third line of plates" respectively. Said at least three lines of plates can extend parallel in the longitudinal direction of the chain. The side surfaces of the at least three lines of plates can be arranged parallel to each other. By the use according to the further variant of the invention of exclusively structurally identical plates in the three or more lines thereof the energy guide chain can be particularly easily enlarged in width, more specifically by arranging a respective additional line of plates, in particular the plurality of or all of the lines of plates of that chain can be of a mutually structurally identical configuration. The respective lines of plates are connected together by a plurality of transverse bars which are respectively coupled to plates of different lines of plates or which can be fixed to the plates thereof, in which case not all transverse bar fixing means of all plates of the chain portion cooperate or have to cooperate with transverse bars. The transverse bars can be of such a configuration that they connect plates in mutually adjacent lines of plates. Optionally alternatively or additionally there can also be transverse bars which are of a greater length and thus for example interconnect the plates of three or more lines of plates, whereby assembly of the chain overall is simplified. If on the other hand however the lines of plates are connected together by transverse bars which respectively connect only two plates of the mutually adjacent lines of plates then that is simpler from the point of view of the technology of manufacture and handling.

In particular in this embodiment with three or more lines of plates the plates are also of such a configuration that it is possible selectively to fix thereto transverse bars which selectively project with respect to the one or the other side surface of the bar and which can be fixed to structurally identical plates of another line of plates, wherein the plates of the different lines of plates are respectively at the same lateral spacing relative to each other.

Furthermore in accordance with the invention according to the further variant there is provided a side plate of an energy guide chain, by means of which an energy guide chain according to the invention can be constructed with the additional use of transverse bars and possibly also separate joint elements, but possibly also without additional separate joint elements.

The invention according to the further variant further concerns a method of manufacturing an energy guide chain according to the invention, in which the plates of the at least two or all of the lines of plates of the chain portion are produced with one and the same shaping tool, in particular an injection moulding tool. The plates are preferably in the form of plastic parts, in particular plastic injection mouldings.

The features of all three aspects are initially disclosed independently in the context of the invention but it will be appreciated they can also be combined together. All features of the individual embodiments shown in the Figures are also to be deemed disclosed in conjunction with any other embodiment if that is not in mutual conflict. All features of the respective embodiments or the respective aspects and configurations set forth hereinbefore are disclosed generally as features of the invention independently of each other and respectively considered per se or in combination with each other also in combination with features of other aspects, embodiments and configurations.

BRIEF DESCRIPTION OF THE DRAWINGS

Further details, advantages and features of the invention will be apparent without restriction in respect of the generality of the foregoing description from the following part of the description in which an embodiment is described in greater detail by means of the accompanying drawings.

In the Figures:

FIGS. 2A-2D show side views of a so-called outer plate (FIGS. 2A-2B) or front and perspective views of a chain link comprising two outer plates and transverse bars connecting same (FIGS. 2C-2D);

FIGS. 6A-6C show views of a rotationally symmetrical side plate or a chain link with two structurally identical such plates for a further second embodiment of an energy guide chain according to the invention as described in DE 20 2020 103046.9;

FIGS. 7A-7G show a chain link of an energy guide chain according to the invention as a perspective view (FIG. 7A), a front view (FIG. 7B), a plan view (FIG. 7C), along section line B-B in FIG. 7B (FIG. 7D), a side view of the chain link as shown in FIG. 7A (FIG. 7E), a detail view of FIG. 7E (FIG. 7F), and a sectional view of the connecting region between transverse bar and plate (FIG. 7G);

DETAILED DESCRIPTION

Figure 1:
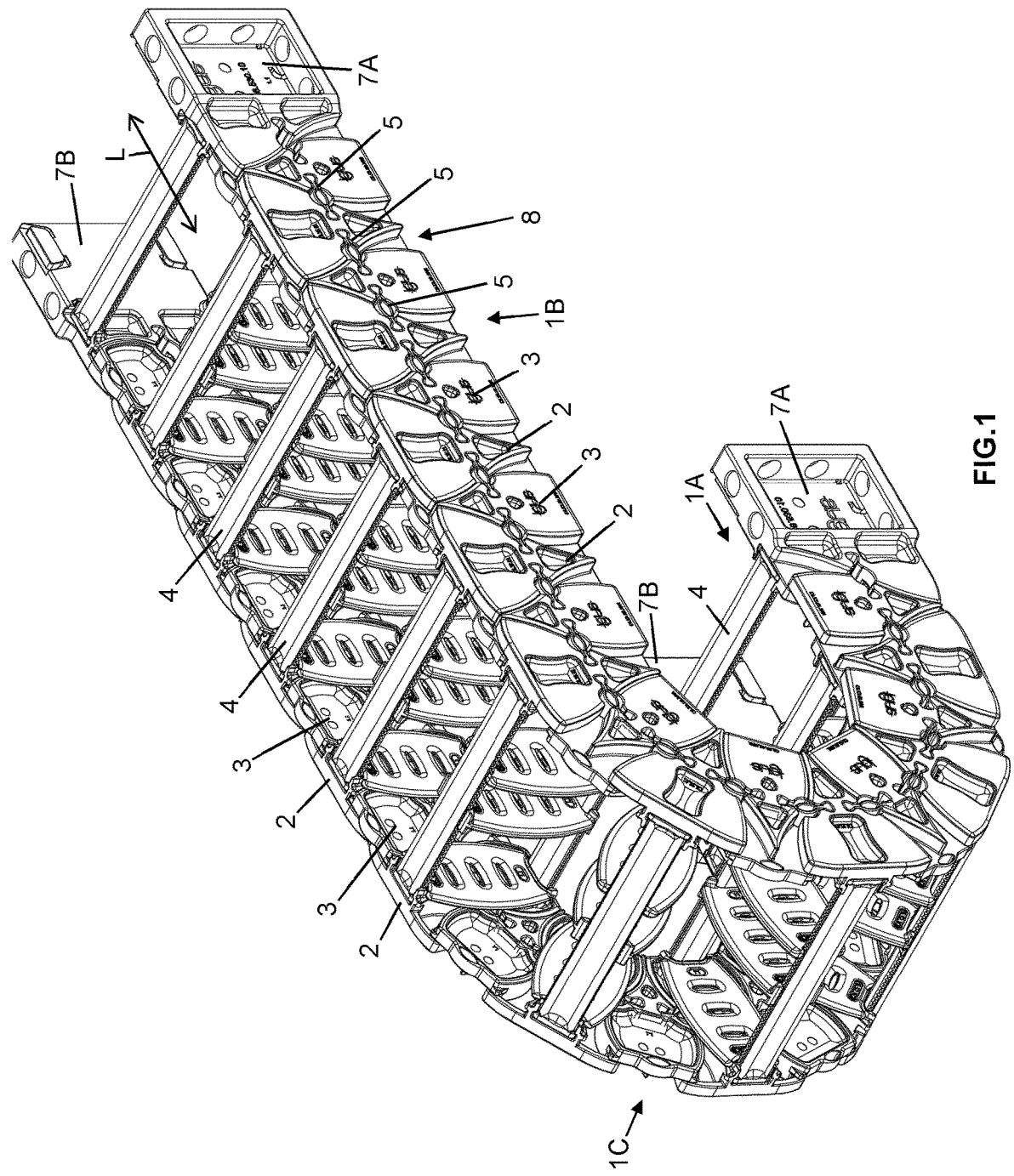
FIG. 1 shows a perspective partial view of an embodiment of an energy guide chain according to the invention.

FIG. 1 shows a perspective view of an energy guide chain 1 according to the invention. The energy guide chain 1 is made up of a plurality of side plates 2, 3 which are connected hingedly to each other in such a way that they can be angled relative to each other. The side plates 2, 3 are assembled to constitute two parallel plate lines which are connected by upper and lower transverse bars 4, here releasably. Between the plate lines of side plates 2, 3 which are disposed in succession in the longitudinal direction L and the transverse bars 4 the energy guide chain 1 forms an inner receiving space serving as a guide passage for example for lines or hoses.

The set of individual parts consisting of two parallel mutually opposite side plates 2, 3 and possibly two associated transverse bars 4 as well as joint connectors 5 connecting the side plates 2, 3 forms chain links which are stable in respect of shape, possibly being rotationally and torsionally stiff, see for example FIG. 2D, as the smallest recurring chain unit.

The illustrated energy guide chain 1 can be deformed to constitute a lower run 1A, a direction-changing region 1C and an upper run 1B and correspondingly displaced. Typically a deposited and resting lower run 1A transitions in the direction-changing region 1C into the moving upper run 1B. The energy guide chain 1 typically serves to supply a moveable machine component with power and/or data lines. At the end the plate lines for fixing to connecting portions have particular end connection elements 7A, 7B having connecting bores. FIG. 1 shows an energy guide chain 1 with a self-supporting upper run 1B which has to be supported only as from a certain length depending on the respective weight of the lines.

As can be seen from FIG. 1 outer plates 2 of a respectively differing configuration, # alternate with inner plates 3 in each plate line in the longitudinal direction of the chain. In both chain lines however, by virtue of their mirror-image symmetry, the same outer plates 2 and the same inner plates 3 are used, as can also be seen from FIG. 3.

As can be seen in greater detail from FIG. 2 and FIG. 3 each outer plate 2 and each inner plate 3 in itself is of a mirror-image symmetrical configuration, more specifically in each case relative to the heightwise plane thereof, in particular the heightwise central plane 51, which extends perpendicularly to the longitudinal direction L or the neutral fibre of the energy guide chain 1, in mirror-image symmetrical configuration at least in its functionally relevant constituent parts. Correspondingly the outer plate 2 and also the inner plate 3 can be respectively used in the left-hand or right-hand plate line, as shown in FIG. 1, by 180° rotation about the heightwise axis H.

As FIG. 1 further shows the hinge-like connections between the alternating inner and outer plates 2, 3 are formed by a joint element 5. As FIG. 1 shows the joint elements 5 extend in the longitudinal direction L, preferably substantially over the entire width of the plates 2, 3 and terminate flush at the respective side surfaces of the plates 2, 3 inwardly and outwardly, that is to say they do not protrude. The width in this respect denotes the dimension of the plates 2, 3 perpendicularly to the longitudinal direction L and the heightwise axis H.

The inner and outer plates 2, 3 are each functionally symmetrical in themselves, that is to say they are of a symmetrical configuration in themselves at least with their abutment surfaces. Features which are irrelevant in terms of function are not an important matter in regard to said symmetry or in regard to such features slight asymmetry in their configuration is possible (for example in regard to stamping labeling and the like).

FIGS. 2A-2D and FIGS. 3A-3D show further details of the inner and outer plates 2, 3.

The outer plates 2, see FIGS. 2A-2D, symmetrically relative to the heightwise plane 51, each have two laterally protruding projections 21A, 21B and two recessed pockets 22A, 22B in the heightwise region which is opposite relationship to the longitudinal plane S2 through the joint connectors 5, which may be disposed centrally but does not have to be.

The inner plates 3, FIGS. 3A-3D, each have two laterally protruding projections 31A, 31B symmetrically relative to the heightwise plane 51, and two recessed pockets 32A, 32B in the opposite heightwise region relative to the longitudinal plane S2 through the joint connectors 5.

The outer plates 2 and inner plates 3 are of a complementarily mutually matching configuration in particular in regard to their functional regions, in particular abutment surfaces.

In the assembled state the projections 21A, 21B of the outer plates 2 respectively engage into a suitably sized pocket 32A, 32B in the two adjacent connected inner plates 3. Correspondingly the projections 31A, 31B of the inner plates 3 also engage into the adjoining corresponding pockets 22A, 22B of the two adjacent outer plates 2.

In that arrangement an outer plate 2 and an inner plate 3 are respectively connected in the longitudinal direction by means of a flexurally resilient joint connector 5 which is shown in FIG. 5 so that the outer plate 2 ad the inner plate 3 are pivotable or can be angled relative to each other to permit the defined transition between the runs 1A, 1B in the direction-changing arc 1C. In that case the direction-changing arc 1C always provides a radius which is predetermined by the geometry and configuration of the plates 2, 3, in particular the spacings between abutment surfaces, to protect the lines and the like from being kinked. In addition the self-supported straight position is maintained in the upper run by abutment surfaces which are operative in the opposite angulation direction in the straight relative position, in particular in respect of the upper run 1B. The abutment surfaces for the completely angled relative position in the direction-changing arc 1C and for the straight relative position, in particular of the upper run 1B, are described hereinafter.

The abutment surfaces for the straight relative position include first inner abutment surfaces 211A, 211B (FIG. 2B) of the projections 21A, 21B of the outer plate 2. Those first abutment surfaces 211A, 211B respectively cooperate with a corresponding first outer counterpart abutment surface 321A and 321B (FIG. 3B) of the pocket 32A and 32B respectively of an inner plate 3 in the straight position, see the upper run 1B in FIG. 1B, in which the energy guide chain is substantially parallel to the longitudinal direction L. The forces between abutment surfaces 211A and 211B and counterpart abutment surfaces 321A and 321B act with a spreading action on the respective pocket 32A and 32B and are caught by a stable embracing relationship on the part of the pockets 32A and 32B, as FIGS. 3B-3C show. Similarly in the straight relative position first outer abutment surfaces 311A, 311B (FIG. 3A) of the projections 31A, 31B of the inner plate 3 are in abutting relationship with corresponding first counterpart abutment surfaces 221A and 221B (FIG. 2A) of a respective pocket 22A and 22B of an outer plate 2.

The abutment surfaces for the completely angled relative position in the direction-changing arc 1C include second outer abutment surfaces 212A, 212B (FIG. 2B) of the projections 21A, 21B of the outer plate 2. Those second abutment surfaces 212A, 212B cooperate in the completely angled relative position with a respective corresponding second inner counterpart abutment surface 322A and 322B (FIG. 3B) of the pocket 32A and 32B respectively of an inner plate 3. The forces between abutment surfaces 212A and 212B and counterpart abutment surfaces 322A and 322B advantageously act as compression forces on the central region of the inner plate 3, which can possibly also be designed with a small thickness (depending on the respectively desired radius of the direction-changing arc), as FIG. 3B shows. Similarly in the maximum pivoted relative position of adjacent plates 2, 3 second inner abutment surfaces 312A, 312B (FIG. 3A) of the projections 31A, 31B of the inner plate 3 further bear in abutting relationship with corresponding second counterpart abutment surfaces 222A and 222B (FIG. 2A) at the respective pocket 22A and 22B of an outer plate 2.

FIGS. 2A-3D further show a thickened central region 20 of the outer plate 2 and a thickened central region 30 of the inner plate 3, at which thinner overlap regions 20A, 20B and 30A, 30B are respectively held at both sides in the longitudinal direction L and in part in the heightwise direction H. With the overlap regions 20A, 20B and 30A, 30B which are comparatively thinner or which are of smaller width the inner and outer plates 2, 3 overlap in the longitudinal direction L, as FIG. 1 shows, so that inter alia this provides for good lateral stability and torsional stiffness about the longitudinal direction. The overlap regions 20A, 20B and 30A, 30B widen in the heightwise direction starting from the longitudinal plane S2 which here extends through the joint connectors 5 and/or can be disposed centrally, that is to say they become larger in the longitudinal direction L. The dimensions of the joint elements 5 and side plates 2, 3 is so set in that case that a narrow air gap G is achieved between the overlapping overlap regions 20A, 20B and 30A, 30B, as shown in FIG. 4. FIG. 4 also shows that the narrow sides which are the outer sides in the direction-changing arc, as shown in the plan view in FIG. 4, determine the nomenclature of the inner and outer plates, which here is in itself interchangeable (at the opposite, less visible narrow side the position would be reversed).

The plates have further abutment surfaces for a long self-supporting length in the upper run 1B and good distribution of forces in the direction-changing arc 1C. These include first end abutment surfaces 201A, 201B on the overlap regions 20A, 20B of the outer plates 2, which are abutment-operative in the straight position, in abutting relationship with first end counterpart abutment surfaces 301A, 301B on the central region 30 of the inner plate 3.

In addition in the direction-changing arc 1C second end abutment surfaces 302A, 302B are in abutment at the overlap regions 30A, 30B of the inner plate 3 with second end counterpart abutment surfaces 202A, 202B on the central region 20 of the outer plate 2.

As FIGS. 2A-3D show all abutment surfaces 201A, 201B, 211A, 211B, 212A, 212B, 302A, 302B, 321A, 321B and counterpart abutment surfaces 202A, 202B, 301A, 301B, 311A and 311B, 322A and 322B are curved in congruent convex and concave relationship respectively, preferably being curved at least predominantly continuously and/or steadily. The selected curvature depends inter alia on the maximum pivotal angle in the fully angled position of the direction-changing arc 1C, that is to say the desired radius of the direction-changing arc 1C. That radius in turn is selectively set inter alia by way of the appropriately selected width of the pockets 22A, 22B and 32A, 32B and spacings between relevant abutment surfaces, wherein FIGS. 2A-3D show a configuration for comparatively small radius. With larger radii the chain division can remain uniformly small or short by the central regions 20, 30 being increased and the overlap regions 20A, 20B, 30A, 30B being shortened.

In contrast to the configuration disclosed in WO 2012/131033 A1 the corresponding inner and outer plates 2, 3 according to the invention both have respectively both abutment projections 21A, 21B and 31A, 31B respectively and also abutment pockets 22A, 22B and 32A, 32B. In that way lateral stability is increased and inter alia improved torsional stiffness of the plate lines about longitudinal axes of the lines parallel to the longitudinal direction is achieved. Neither of the two plates can drop off or become detached laterally, for example in the event of breakage or detachment of a joint connector, that is to say the chain cannot readily break up.

In the preferred example two opposite heightwise regions are separated by the longitudinal plane S2, here extending through the joint connectors 5. At the outer plates 2 the pockets 22A, 22B are respectively provided in the upper heightwise region in FIGS. 2A-2B while the projections 21A, 21B are provided in the opposite lower heightwise region. At the inner plates 3 the projections 31A, 31B are provided in a Correspondingly reversed configuration in the upper heightwise region in FIGS. 3A-3D and the pockets 32A, 32B are provided in the opposite lower heightwise region, wherein the position upper and lower depends on the respectively reversed position of the plates 2, 3 in the runs 1A, 1B.

Furthermore FIGS. 2A-2D and FIG. 4 show transverse bar receiving means of the outer plates 2, which are in the form of clamping receiving means 40 which is in one piece with the outer plate 2, and form two clamping surfaces 40A, 40B which are in opposite relationship in the longitudinal direction L and between which a fixing portion 41, of complementary shape, of the transverse bar 4 is clamped. For secure fixing the clamping surfaces 40A, 40B advantageously have a convex latching region as FIG. 2A shows and lock in the lateral direction by a tongue-and-groove connection to the end of the fixing portion 41 (FIG. 4).

FIG. 1 shows a further advantage of the configuration of the plates 2, 3 (inter alia with respect to FIG. 6), whereby the narrow sides of the plates 2, 3, that are towards the respective other run 1A and 1B, form a straight-line support 8 which is interruption-free in the longitudinal direction L so that the upper run 1B, in relation to long travel distances, can be advantageously supported, for example on rollers or a sliding rail.

Figure 3A:
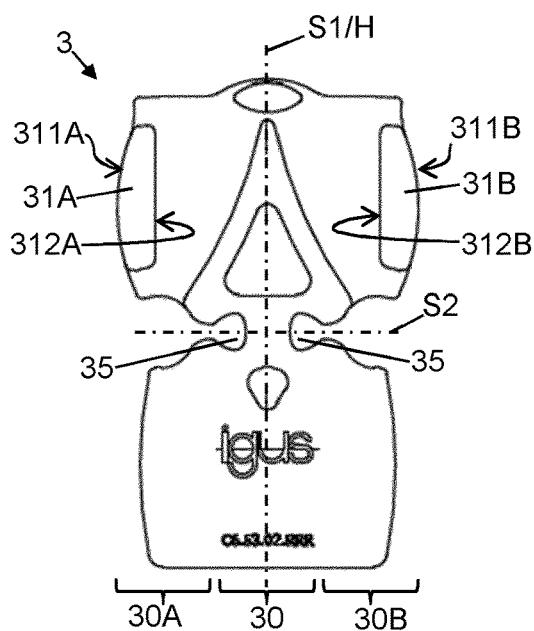
FIGS. 3A-3D show side views of a so-called inner plate (FIGS. 3A-3B) or perspective views of the inner and outer plates (FIGS. 3C-3D)
Figure 3B:
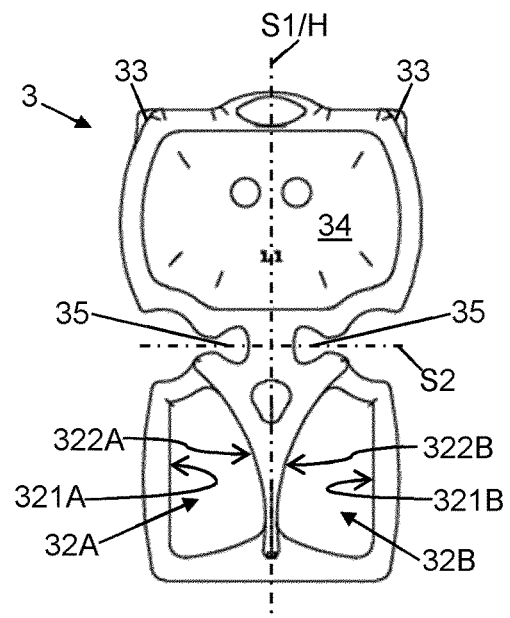
Figure 3C:
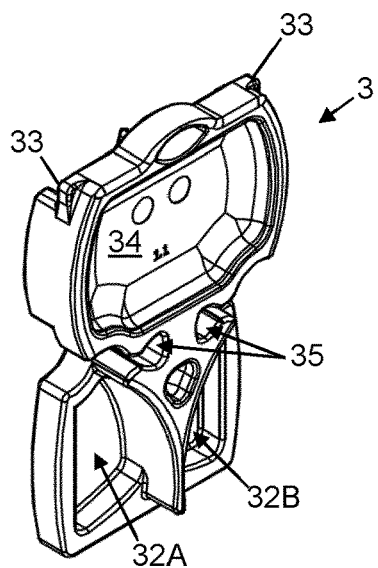
Figure 3D:
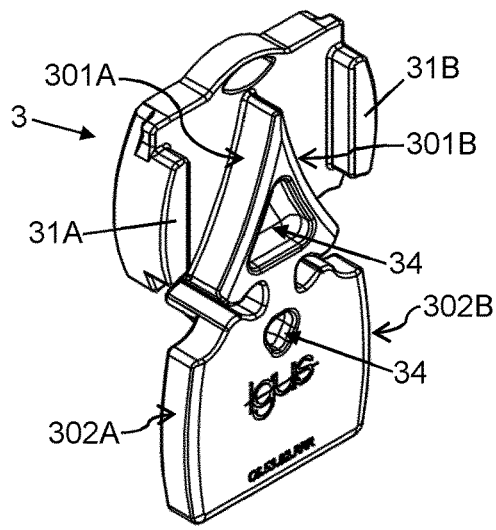
Figure 4:
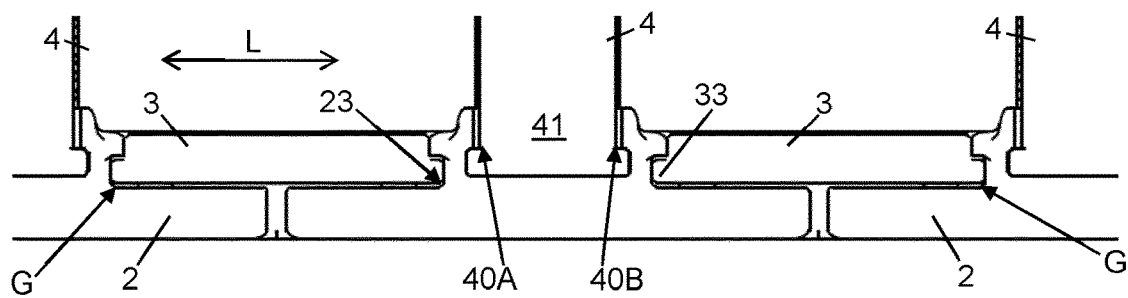
FIG. 4 shows an enlarged plan view of a plate line of FIG. 1 in a view from radially outwardly with respect to the direction-changing arc.

FIGS. 3A-3C show an additional development whereby the side plates 2, 3, here in particular the inner plates 3, include a deformable damping region 9 at the narrow side which is disposed outwardly in the direction-changing region 1C or which faces away from the respective other run 1A, 1B. The damping region 9 serves for damping the transition of the direction-changing region 1C into the lying lower run 1A, that is to say when the plate 3 encounters a support, and thus reduces vibration and noise. In this example the damping regions 9 are of a bridge-shaped configuration, produced in one piece with the narrow side of the inner plate 3. The damping region 9 is here advantageously in the form of an arcuate spring element which is stressed in respect of pressure and which is connected on both sides to the narrow side of the inner plate 3 and extends substantially in the longitudinal direction.

As can best be seen from FIG. 4, to further enhance lateral stability and torsional strength in the straight position of the upper run 1B, provided at the end at the upper corner regions of the overlap regions 30A, 30B of the inner plate 3 are two oppositely disposed stiffening extensions 33 which project predominantly in the longitudinal direction L and which in the straight position respectively engage in a corresponding stiffening receiving means or recess 23 at the end on the central region 20 of the outer plate 2.

For saving on material, reducing weight, and/or optimising the flow of force or the stability in respect of shape in the manufacturing process, material recesses 24, 34 can be provided in the central regions 20, 30; the boundary surfaces of the material recesses 24, 34, on the plate body, are preferably shaped to avoid force peaks with in particular predominantly concavely curved delimiting surfaces, for example in the context of manufacture of the plates 2, 3 from plastic using injection moulding methods.

In addition the inner and outer plates 2, 3 in the central region of the plate height, level with the longitudinal plane S2, respectively have two oppositely disposed fixing receiving means 25, 35, in which a respective fixing end 51A, 51B of the joint connector 5 is pressed in positively locking and force-locking relationship. The fixing receiving means 25, 35 are also of a mirror-image symmetrical configuration with respect to the heightwise plane 51 and also the longitudinal plane S2 and are of a suitable cross-section which is conjugate with the fixing ends 51A, 51B, with a slight undersize for a press connection which is long-lasting in strength. The fixing receiving means 25, 35 are open continuously in the width direction so that assembly or dismantling can be effected from both sides. The joint connectors 5 are preferably of a slight overlength with respect to the nominal spacing between the opposite fixing receiving means 25, 35 so that the joint connector is slightly compressed in the straight position of the runs 1A, 1B.

Figure 5A:
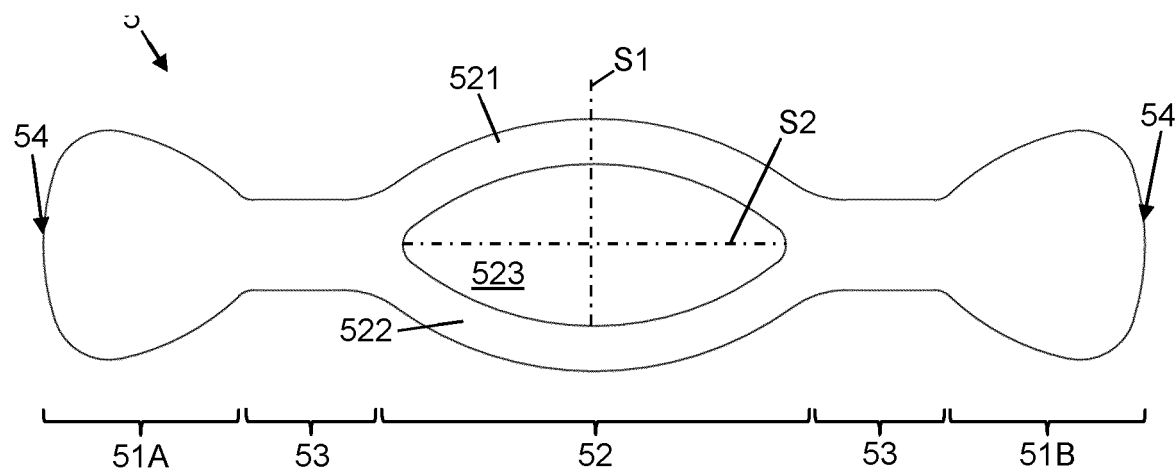
FIGS. 5A-5B show a side view and a perspective view of a joint connector according to a independent aspect of the invention.
Figure 5B:
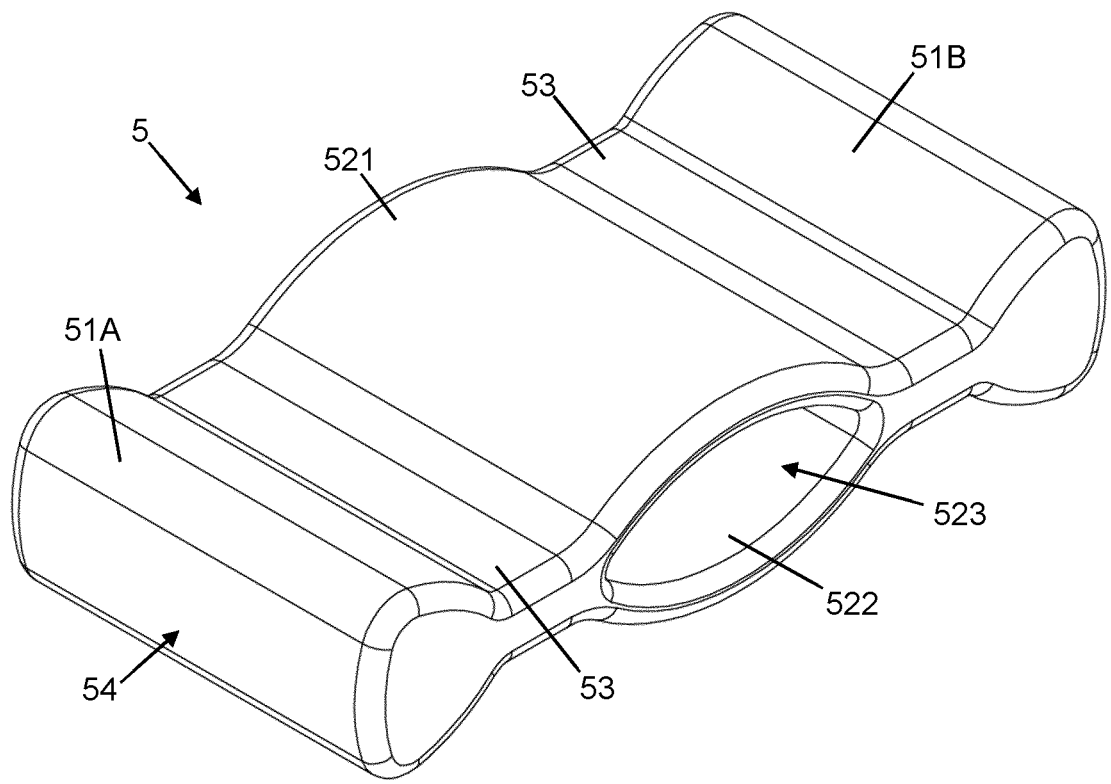

FIGS. 5A-5B show the preferred joint connector or the joint element 5. The joint connector 5 is a plate-like separate component which is extended in the longitudinal direction L of the energy guide chain 1 and comprises a permanently elastic plastic. Correspondingly to the plates 2, 3 the joint element 5 is also of a mirror-image symmetrical configuration with respect to the heightwise central plane 51. It is a body with fixing ends 51A, 51B, a central region 52, and plate-like transitional regions 53 at each of the opposite end regions or fixing ends 51A, 51B. To improve flexural strength and compressibility in the straight position the central region 52 has two material regions 521, 522 which are curved outwardly in opposite relationship, with a hollow space 523 which is disposed therebetween and which is open at both sides.

The cross-section of both fixing ends 51A, 51B are not circular-cylindrical here but are of a substantially trilobular configuration (in the manner of a trilobate) or of an approximately triangular configuration so that, even upon angular relationship or appropriate flexing, a non-rotary positively locking connection of the fixing ends 51A, 51B in the corresponding fixing receiving means 25, 35 is guaranteed, that is to say no abrasive wear can occur by virtue of friction caused by rotation.

The fixing ends 51A, 51B are markedly thickened or are of a considerably greater cross-section in relation to the transitional regions 53 in order to reliably exclude unwanted detachment from the fixing receiving means 25, 35 as the dimension of the gap at the mouth opening into the fixing receiving means 25, 35 corresponds to the structural height of the transitional regions 53 or is of a slightly undersize relative thereto in order to clamp the transitional region 53 at the boundary surfaces of the mouth opening.

In the illustrated embodiment the joint element 5 respectively connects precisely two plates 2, 3 together, here in each case an outer plate 3 with an inner plate 2. For fixing at the inner plate 2 the joint element 5 has fixing regions or thickened portions 53 at the end. The thickened portions 53 which serve for securing or fixing at fixing receiving means of the plates 2 and 3 respectively are here approximately trilobular or approximately triangular.

Each fixing region 51A, 51B further has at least at its end facing in the longitudinal direction L, a flattened and/or curved contact surface 54, the radius of curvature of which is markedly greater than half the largest cross-sectional dimension of the fixing region, in particular markedly larger than the radius of the periphery to the trilobular cross-section. The surface 54 thereby inter alia allows advantageous application over a large area of compression force for the damping action by compression in the transition to the straight position or to increase the preload in the self-supporting upper run which is increased by the elastic restoring force of the curved material regions 521, 522. Other comparable cross-sections, for example a triangular shape or possibly also a quadrangular shape with rounded corners are also in accordance with the invention.

In regard to the alternative embodiment in FIGS. 6A-6B the teaching of DE 20 2020 103 946.9 is incorporated in its full extent and only some differences are discussed here. With the configuration of the plate 6 shown in FIGS. 6A-6B it is possible to provide successive structurally identical side plates 6 continuously in both plate lines.

That is achieved in particular by the side plate with its abutment-operative abutment surfaces in themselves being rotationally symmetrical with respect to a heightwise axis H or axis of rotation R which extends perpendicularly to the longitudinal direction L of the chain and at least substantially parallel to the side plates 6, preferably in the central plane thereof.

The side plate 6 has two projections 61C, 61D which project away from the receiving space and two projections 61A, 61B which project towards the receiving space and the side plate has two abutment pockets 62A, 62B which are open towards the receiving space and two abutment pockets 62C, 62D which open away from the receiving space.

The side plate 6 can be produced with just one moulding tool and also allows use in more than three lines, as described in DE 20 2020 103 046.9.

Figure 7F:
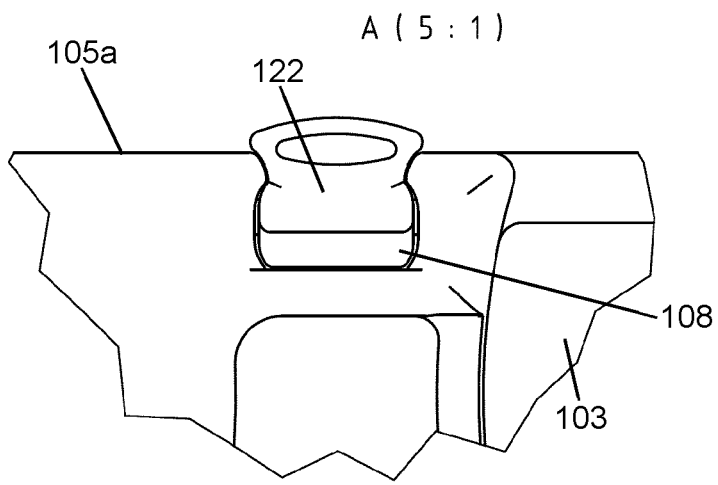
Figure 7G:
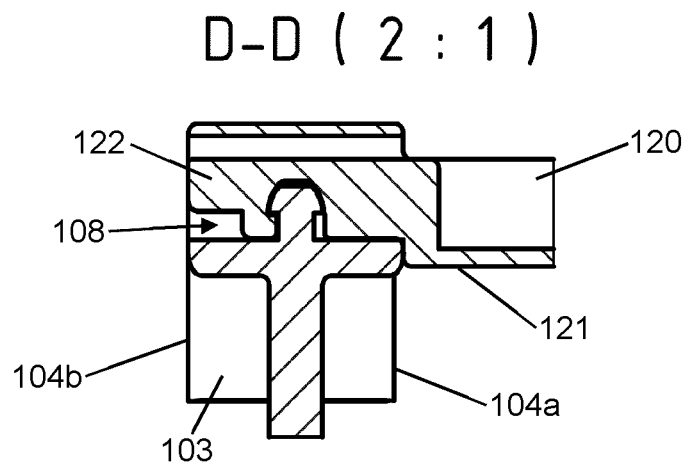
Figure 8A:
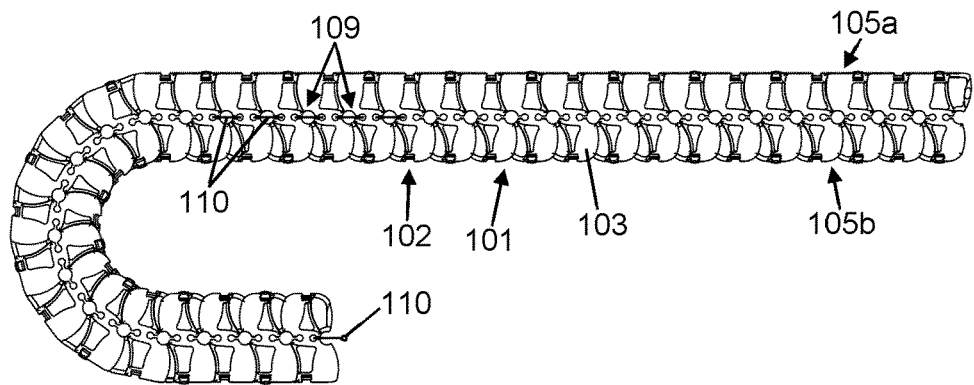
FIGS. 8A-8C show an energy guide chain comprising chain links as shown in FIG. 7 as a plan view (FIG. 8A), a side view (FIG. 8B) and a perspective view (FIG. 8C)
Figure 8B:
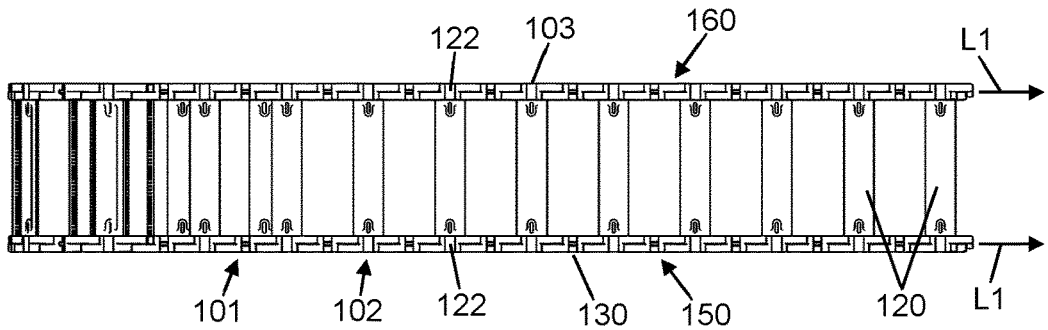
Figure 8C:
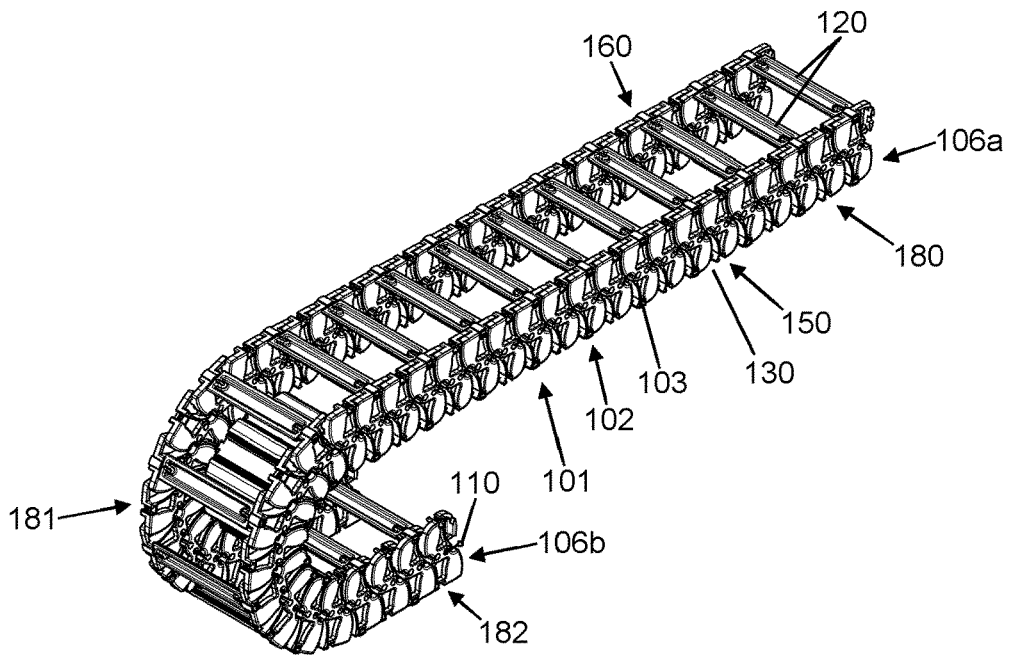
Figure 9A:
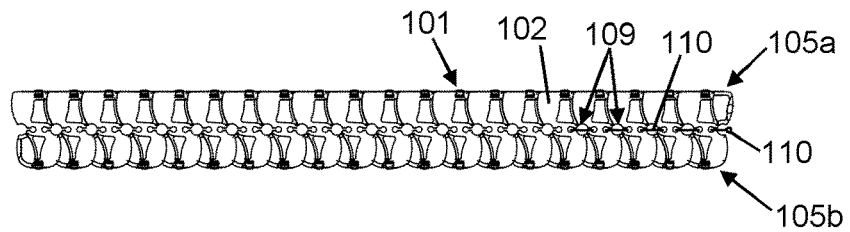
FIGS. 9A-9C show a development of the energy guide chain of FIG. 8C with more than two mutually parallel lines of plates and transverse bars connecting same as a plan view (FIG. 9A), a side view (FIG. 9B) and a perspective view (FIG. 9C)
Figure 9B:
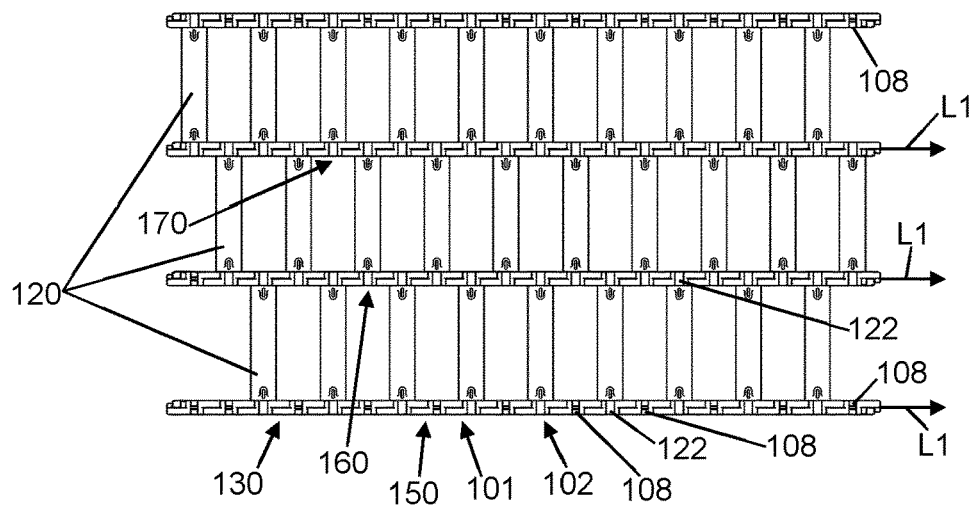

FIG. 7 shows a chain link 102 of an energy guide chain 101 according to the invention for guiding lines, wherein the chain has a multiplicity of hingedly interconnected chain links 102 which constitute a receiving space 102a for receiving and guiding the at least one line (FIGS. 8 and 9). The respective chain link 102 has oppositely disposed plates 103 with inner and outer or first and opposite second side surfaces 104a, b and narrow sides 105a, b substantially parallel to the longitudinal direction of the chain 101. As shown in FIGS. 8 and 9 at least some or all of the links 102 have at least one transverse bar 120 releasably connecting the plates 103 together, as shown in FIG. 7 at least one transverse bar 120 is or can be fixed to the chain link 102 at both opposite narrow sides 105a, b of the respective plate 103. At both mutually opposite end regions 21 the transverse bars 120 have fixing means 122 for releasable fixing to a plate. The plates 103 of the chain link 102 ("link") have at each of both narrow sides v5a, b fixing means 108 for releasably fixing the corresponding transverse bar fixing means 121.

The plates 103 of the link 102 have joint connections 109 which can be hingedly connected together, or are connected together in the chain, with corresponding joint connections 109 of the plates 103' of the adjacent chain link 102' optionally for example by means of separate joint elements 110, that is to say at least two joint connections 109 on the respective plate. The joint connections 109 are here arranged on the plate ends 106a, b, which is particularly advantageous but not mandatory. Here the plate 103 at both end regions 107a, b spaced in the longitudinal direction L of the plate, has more specifically at the plate ends 106a, b two receiving means 109a for coupling of a respective separate joint element 110 which can be connected to a corresponding joint element receiving means of an adjacent plate. The joint element receiving means 109a are here arranged in the thickness region 111 of the plate 103. The joint connections 109 of the plate 103 are here each in the form of a holding and fixing region for coupling a separate joint element 110.

Figure 10A:
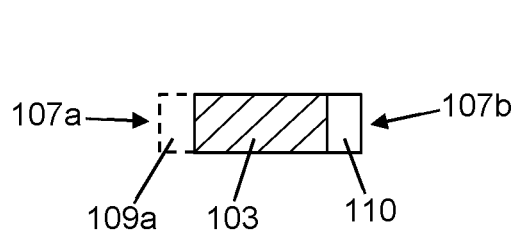
FIGS. 10A-10B show various views of different joint connections of adjacent plates at the level of the joint connection (FIGS. 10A, 10B.
Figure 10B:
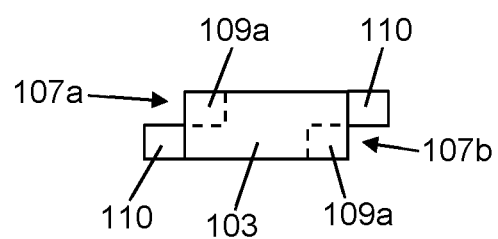

FIG. 10 shows diagrammatic views of joint element arrangements of the plate 103 at the level of the joint connection 109. As shown in FIG. 10A for example a joint element 110 can be arranged permanently or releasably on the plate 103, for example also being formed in one piece thereon, at a joint connection of the plate at an end region 107a, b thereof, in particular at the plate ends, and a joint element receiving means 109a for holding and fixing a joint element of the adjacent plate can be provided at the mutually opposite plate end region, in particular the end face thereof. Alternatively as shown in FIG. 10b for example the joint elements 110 can also extend only approximately over half the plate width and a joint element 110 and a joint element receiving means can be arranged at both plate end regions or plate ends, those being arranged rotationally symmetrically about the axis of rotation R of the plate. The joint connections with the joint element receiving means 109a in FIG. 10, like the joint element receiving means in FIG. 7, can also be arranged at approximately half the height on the plate in the thickness region 111. Optionally the joint connections of adjacent plates can also be connected together to constitute the joint connection 109 so that joint elements can also be provided at both plate end regions, for example at the ends thereof.

Figure 9C:
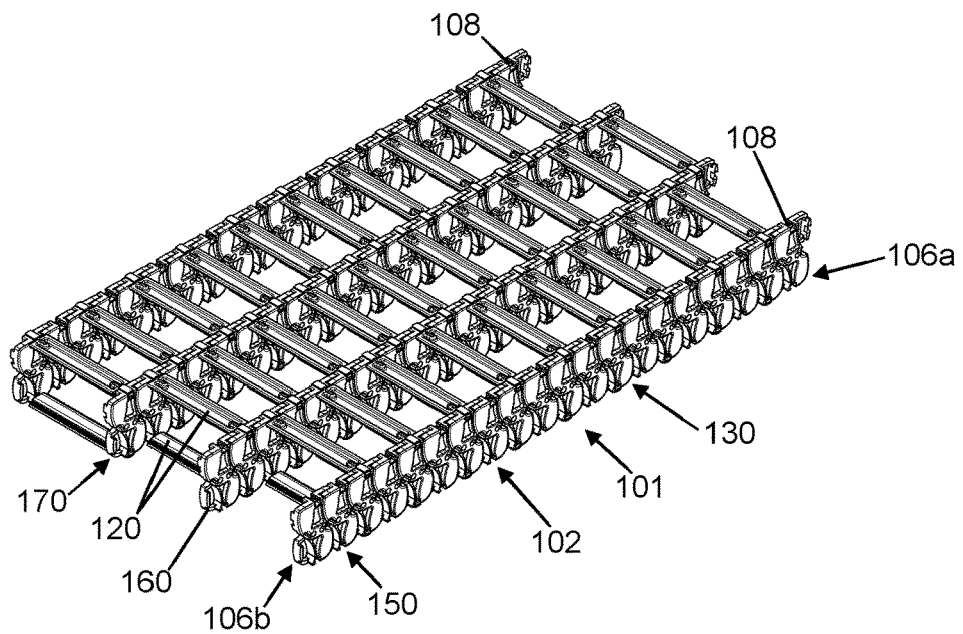

The plate ends can here respectively extend in the region of the joint element receiving means to the thickness region 1111 of the plate 103 or can be arranged partially or completely in same. The respective plate 103 therefore has at at least one end thereof a joint element which cooperates with an adjacent structurally identical plate, constituting a joint connection between the plates. The pivotably interconnected plates of chain links arranged in succession in the longitudinal direction of the chain form at least two laterally mutually spaced lines of plates 150, 160 which extend in the longitudinal direction of the chain and between which at least a part of the receiving space 102a for the at least one line is arranged (FIGS. 8, 9). FIGS. 8, 9 show only some of the joint elements 110 of the line of plates. Successive chain links of the energy guide chain are variable in position relative to each other by virtue of the joint connections 9 between adjacent links 102 or plates 103, for example to constitute two or more runs with a direction-changing region respectively connecting them, like for example an upper run 180, a lower run 181 and a direction-changing region 182 as shown in FIGS. 8c and 9c.

The receiving space 102a is of a box-shaped configuration. The plates 103 are preferably in the form of substantially plate-shaped components. The inner and the outer plate side surfaces 104a, b are flat and smooth, wherein there are recesses set back from the flat plate side surfaces to save on material and/or to reduce shrinkage distortion in the production of the plates, preferably in the form of plastic plates. The fixing means 108 of the plates for the at least one or all transverse bars, the joint connections 109 for pivotably connecting adjacent plates and the abutments for delimiting the joint movement of adjacent plates are arranged completely between the plate side surfaces. The line of plates 150, 160, 170 has a continuous flat inside and outside at least substantially over its length.

Referring to FIGS. 8 and 9 in a configuration extending continuously over a chain portion 130 which includes at least more than three adjacent chain links 102 and which includes the at least two or all of the lines of plates 150, 160, 170, the lines of plates overall are made up continuously, that is to say completely, from mutually structurally identical plates (as shown in FIGS. 8 and 9) so that the respective plate 103 can be arranged selectively at any position on any of the various lines of the chain portion. The plates 103 of the chain portion, that is to say also all lines of plates thereof, are here of a structurally identical configuration with each other. The chain portion comprising structurally identical plates extends here over the entire length of the lines of plates 50, 160, 170 or the chain 101. The end links of the chain or the end plates of the lines of plates (not shown) can however be of a different configuration, for example can additionally have fixing regions for fixing same to an entrainment member of the chain 1 or to a connection point of the chain, in which case it is also possible for those fixing regions to be provided on each of the structurally identical plates. The expression "the plates" of the chain portion relates generally to all plates of the chain portion, which correspondingly applies to the transverse bars 20. Generally in accordance with the invention therefore a given transverse bar can be selectively fixed to any plate of the chain portion, connecting plates of different, preferably adjacent lines of plates, by means of the transverse bar. All transverse bars 120 can be releasably fixed to the plates at both end regions 121 of the bar.

All plates 103 of the chain portion 130 have respective fixing means 108 for the at least one transverse bar at or in the region of both of the plate narrow sides 105a, b, being of such an arrangement and configuration that the transverse bar 120 can be fixed to the plate selectively from one or the other of the two plate side surfaces 104a, b, that is to say extending away from the side surface, as shown in FIGS. 8 and 9, this being in relation to both plate narrow sides. All fixing means of the plates of the chain portion for the transverse bars are of the same structural configuration. All transverse bars of the chain portion are of the same structural configuration and have at least structurally identical fixing means for connection to the plates. At or in the region of a or each of the plate narrow sides of the respective plate a plurality of transverse bars can also possibly be fixed there, by providing suitable fixing means on the respective plates. The plate fixing means 108 for the transverse bar, here for both transverse bars, are provided permanently and non-releasably on the respective plate, preferably being formed in one piece on the plates. The expression "one-piece formation" includes generally a one-piece configuration of the fixing means 108 with the plate, wherein the fixing means can also be in the form of a recess 108a in the plate.

All of the plates 103 of the chain portion 130 have respective abutments 112 which cooperate with corresponding abutments 113 of the respectively adjacent chain link for limiting the pivotal movement of adjacent plates relative to each other. The abutments 112, 113 are permanently connected to the plates, preferably being formed in one piece thereon. Each of the abutments has a respective formation region at the respective plate, here in the form of an extension thereof, wherein the free end of the abutment, that is opposite to the formation region, is not covered over by another region of the respective plate. The plates 103 are of the identical structural configuration in relation to the abutments 112, 113, this also including the configuration and arrangement of the abutments on the structurally identical plates.

The transverse bars 120 are each of an at least substantially rectilinear configuration and/or the transverse bar end regions 121 are at least substantially arranged in a straight line with each other. The plate fixing regions 108 for the transverse bars 120 are preferably adapted for fixing at least substantially straight transverse bars.

The plate fixing means 108 for the respective transverse bar 120 or for all of the transverse bars of the chain link are here in the form of clamping and/or latching means for cooperation with corresponding fixing means 122 of the transverse bars, without being restricted thereto. The fixing means 108 of the plate are here provided in the region of or more precisely in a receiving groove 108a and/or clamping receiving means of the plate for a transverse bar end region, which is particularly advantageous in the context of the invention, the above-mentioned fixing means however can also be of a different configuration. In this case the receiving groove 108a can itself form the fixing means 108, and can also be in the form of a clamping and/or latching receiving means. The transverse bar 120 can be secured in the plate groove 108a in a clamping fit and/or in latching relationship, for which purpose the groove sides cooperate clampingly and/or latchingly with the transverse bar fixing means 122, optionally alternatively or additionally also fixing means at the groove bottom. A clamping receiving means can for example also be arranged locally in the region of or at a plate narrow side, for example in the form of a local recess, or in some other suitable fashion. The receiving groove 108a extends from the inner plate side surface 104a in a direction towards the opposite outer plate side surface 104b or as far as same, that is to say here continuously over the entire plate width. The groove 108a can also be interrupted by a bar or the like, possibly partially. The plate groove 108a is of an open configuration at both groove ends. That provides a structurally compact configuration for the plate, at which the transverse bar 120 can be fixed to the plate selectively projecting from one of the two plate side surfaces 104a, b with an end region 121. The transverse bar 120 in that case is fixed in angularly stable relationship to the plate. The angular stability can relate on the one hand with reference to preventing deflection of the transverse bar in the longitudinal direction of the chain so that the chain link is of a particularly stable configuration in shape. Angle stability can alternatively or additionally also relate to the transverse bar 120 being secured to prevent pivotal movement thereof about the longitudinal direction L of the plate or the narrow side of the plate. In addition the transverse bar is fixed with its end region to the plate to prevent displacement in relation to the longitudinal direction of the transverse bar. For that purpose displacement-preventing means 108b are provided on the plate, which here are in the form of a projection, in particular a latching projection, which engages the transverse bar end region. The displacement-preventing means 108b are here arranged in the receiving groove 108a. That fixing of the transverse bar is particularly suitable so that the chain link on the one hand has high stability and on the other hand can be used in accordance with the invention.

The end region of the transverse bar 120, that engages over the plate 103, with the fixing means 122, here extends from the plate inside beyond the central plane of the plate in a direction towards the outer plate side surface or as far as same, without projecting from same. The transverse bar end region which engages over the plate is here arranged completely in the cross-sectional region of the plate. That transverse bar end region here extends over the entire plate width or the entire longitudinal extent of the receiving groove. That provides for stable and space-saving fixing of the transverse bar to the plate.

The described configuration of the fixing means for the transverse bar to the plates is particularly suitable for fixing the transverse bar to the respective plate in a stable fashion and also to arrange it selectively projecting from one plate side surface or the other.

The transverse bars 120 can generally be of a one-piece configuration. The transverse bars 120 can possibly also each be of a multi-part configuration and for example at one or both of their end regions can have a separate connecting portion 123 for connection of the transverse bar to the plate 103. The fixing region between transverse bar and plate, for example the transverse bar end region, can also be made with a different material from the body of the transverse bar, which in particular can be of a higher elasticity or lesser hardness, which material can also be captively fixed to the transverse bar, for example by being glued thereto or being formed in one piece thereon, like for example in an injection moulding method, for example a 2-component injection moulding method. The connecting portion 123 is here arranged between the transverse bar end region 121 and the plate 103. Upon dismantling of the transverse bar 120 the connecting portion 123 remains in the appropriate fashion on the transverse bar or the plate. That different material and/or connecting portion 123 can improve the clamping and/or latching connection between transverse bar 120 and plate 103 in respect of the holding force.

The plates 103 each have a central region, that is to say a middle region, in relation to the longitudinal extent thereof, which is in the form of a thickened region 111. The thickened region 111 of the plate has the fixing means 108 of the plate for fixing the at least one or more transverse bars 120. The thickness region 111 extends in relation to the plate height approximately to or actually to the two plate narrow sides 105a,b. Extensions 114, 115 extending in the longitudinal direction L1 of the plate extend from the thickened region 111 of the plate, the extension 114, 115 being at least substantially of a plate-shaped configuration and being of a smaller width than the thickened region 111 of the plate. With adjacent plates 103 in the line of plates 150, 160, 170 the extensions 114, 115 of the adjacent plates laterally overlap each other. The joint connections 109 of the plate are spaced from the narrow sides 105a, b, here arranged at the central heightwise region of the plate. The extensions 114, 115 are arranged at both plate end regions 107a, b respectively on both sides of the joint connection, that is to say with the given position of the plate one "above" and one "below" the joint connection so that here four extensions 114, 115 are provided on the plate.

The plate extensions 114, 115 are arranged here in interlaced relationship: with respect to the respective plate end 106a, b one of the extensions 114, 115 is arranged at the inner plate side surface 4a and the other extension 114, 115 is arranged at the outer plate side surface, and this applies to both plate ends 106a, b, wherein with respect to the longitudinal direction L of the plate for the extensions 114 above the joint connection one of the extensions is arranged at the plate inside and the other extension is arranged at the plate outside, which correspondingly—although with the reversed association of the extensions with the respective plate side surface—also applies to the extensions 115 below the joint connection. In general the plates however can also be of a cranked configuration, in which respect however the interlaced configuration is preferred in respect of the stability of the line of plates and also the flexible arrangement of the respective plates in different lines of plates at any position about the axis of rotation thereof.

The abutments 112, 113 of the respective plate for limiting the joint movement relative to each other in displacement of the chain are here arranged at the plate extension 114, 115 and project laterally therefrom, that is to say in the longitudinal direction of the transverse bars 120 fixed to the plates, and away from the extensions. In the case of adjacent plates in a line thereof the abutment 114, 115 of a plate engages into a recess 116, 117 which is open with respect to a plate side surface, in the adjacent plate 103. The extent of the respective abutment 112, 113 in the direction of the plate height, that is to say the spacing of the plate narrow sides, is in this case smaller than the extent of the recess 116, 117 respectively receiving same in the direction of the plate height so that the adjacent plates are pivotable relative to each other. The abutment 112, 1113 in this case can be arranged play-free or almost play-free in the longitudinal direction of the plate in relation to a region of the adjacent plate and in the joint movement is moved past same, here the thickened region 111 of the plate, thereby affording a further enhancement in transverse stability of the line of plates. The contours of the surfaces, which face towards each other in the longitudinal direction L of the plate, of the abutments 112, 113 and the adjacent link, here the thickness region 111, are of a congruent configuration with each other. Generally, and less preferred, abutments 112, 113 however can also project in the longitudinal direction of the plate L1 away from the extensions and for example engaged into a recess which is open towards the plate end 106a, b, for limiting the joint movement (this is not shown).

The plates can have damping elements (not shown) which are provided for abutment damping when adjacent plates of a line thereof abut against each other, and are also of a structurally identical configuration on the plates. The damping elements can be arranged for example in receiving means 114a of the plate extensions 114.

The chain portions 130 including the lines of plates 150, 160, 70 are in total constituted continuously, that is to say completely, from plates 103 which can be imaged on to each other in adjacent or different lines of plates 150, 160, 170 of the chain 101 by translative displacement along the longitudinal direction in which the transverse bars 120 extend. That can apply to all lines of plates of the chain portion.

The chain portions 130 including the lines 150, 160, 710 of plates are in total constituted continuously, that is to say completely, from plates 103 which in themselves are rotationally symmetrical, more specifically with respect to an axis of rotation R1 which extends perpendicularly to the longitudinal direction L1 of the plate and at least substantially parallel to the plate side surfaces 104a, b and which preferably extends on the central plane M1 of the plate. That therefore also applies to the fixing means 108 of the plates for the transverse bars 120, joint connections 109 of the plates for pivotable connection to adjacent plates and the abutments 112, 113 for limiting the pivotal movement of adjacent plates relative to each other. That can apply to all lines of plates of the chain portion. The chain portion 130 or the chain 101 is thereby of a particularly simple structure and the advantages according to the invention are afforded in a particular fashion.

The fixing means 108 of the respective plate 103 for the transverse bars 120 and/or the joint connections of the plates are arranged symmetrically relative to the central plane M1 of the plates and here are arranged independently of each other and preferably at the same time also in the central plane M1 of the plates. The central plane M extends parallel to the plate side surfaces 104a, b, centrally in relation thereto. The plate extensions 114, 115 respectively extend as far as the plate central plane M1.

Referring to FIG. 9 the energy guide chain has at least three or more laterally mutually spaced lines of plates 150, 160, 170 extending in the longitudinal direction of the chain, wherein the chain portion 130 which extends continuously over at least a plurality of adjacent chain links, in accordance with the invention, is made up continuously and completely from structurally identical plates 103, with respect to the three or more lines of plates. The at least three or all of the lines of plates 150, 160, 170 extending in the longitudinal direction of the chain are made up completely from structurally identical plates.

In the chain 101 shown in FIG. 9 first chain links 102a are provided in relation to a first pair of adjacent first and second plate lines 150, 160, wherein the plates 103 in different plate lines 150, 160 are connected together at both narrow sides 105a, b with releasable transverse bars 120, forming chain links 102a. In addition there are second chain links 102b in which the plates in different plate lines 150, 160 are not connected together with transverse bars. In the two adjacent first and second plate lines 150, 160 first and second chain links 102a, 102b are disposed in succession in the longitudinal direction of the chain. In a third further plate line 170 of the chain 101 there are the first and second chain links 102a, b in succession in the longitudinal direction of the chain. The second plate line 160 is arranged between the first and third lines 150, 170. Provided at the second plate line 160 are plates 103 which are releasably connected by means of transverse bars 120, preferably only, to plates of the first plate line 150, wherein the second plate line 160 further has plates 103 which are releasably connected by means of transverse bars 120, preferably only, to plates of the third plate line 170. The plates 103 of all three plate lines are of structurally identical configuration. All plate lines are continuously made up of structurally identical plates.

As shown in FIG. 9 there are three or possibly more plate lines 150, 160, 170, wherein at least one plate line 160 is arranged between two adjacent plate lines 150, 170, forming a first, a central second and a third plate line, wherein the second plate line 160 is releasably connected with transverse bars to the two adjacent plate lines 150, 170. Selected plates 103 of the second plate line 160 are connected either only to plates of the first line or only to plates of the third line, or selected plates 103 of the second plate line 160 can be releasably connected with transverse bars 120 to plates of both adjacent plate lines 150, 170.

Referring to FIG. 9 the chain links 102 at the opposite plates 103 of adjacent lines of plates 150, 160, 70 are respectively either connected at both narrow sides 105*a*, *b* to a transverse bar 120 and at the following chain link 102 they are not connected with transverse bars. Optionally there may also be provided in the chain link 101 only one respective transverse bar 120, while in the case of links 102 which are disposed in succession in the longitudinal direction of the chain same may be provided for example alternately at the one or the other narrow side 105*a*, *b* of the adjacent plates 103 of the pair of lines of plates.

As shown in FIG. 9 there are three or possibly more lines of plates 150, 160, 170, wherein at least one plate line 160 is arranged between two adjacent lines 150, 170. The second central plate line 160 is releasably connected with transverse bars 120 to the two adjacent plate lines 150, 170. The second plate line 160 has plates 103 which are connected at one of the narrow sides 105*a* of the respective plate 103 to the first plate line 150 by means of a releasable transverse bar 120 and to the third plate line 170 at the other narrow side 105*b* of the same plate 103 by means of a releasable transverse bar 120.

The plates 103 of all of the plate lines shown in FIGS. 8 and 9 are of the same structural configuration continuously along the lines. Reference is directed to the rest of the description relating to the invention and alternative or further configurations of the plates. All plates of the various plate lines of the chains or all of such plate lines as shown in FIGS. 8 and 9 can be produced with one and the same shaping tool, in particular an injection moulding tool, or are correspondingly manufactured.

LIST OF REFERENCES 1 energy guide chain
1A lower run
1B upper run
1C direction-changing region or arc
2 outer plate
3 inner plate
4 transverse bars
5 joint connector or joint element
6 plate
8 support
9 damping region
7A, 7B end connecting elements
20 thickened central region
20A, 20B overlap regions
21A, 21B projections
22A, 22B pockets
23 stiffening receiving means or stiffening
24 material recess
25 fixing receiving means
30 thickened central region
30A, 30B overlap regions
31A, 31B projections
32A, 32B pockets
33 stiffening extensions
34 material recess
35 fixing receiving means
40 clamping receiving means
40A, 40B clamping surface
41 fixing portion
51A, 51B fixing end or region
52 central region
53 plate-like transitional region
54 contact surface
61A, 61B projections
61C, 61D projections
62A, 62B abutment pockets
62C, 62D abutment pockets
101 energy guide chain
102, 102' chain link
102*a*, *b* chain links
103, 103' plates
104*a* inner plate side surface
104*b* outer plate side surface
105*a*, *b* narrow sides
106*a*, *b* plate ends
107*a*, *b* end regions
108 fixing means
108*a* recess, receiving groove
108*b* displacement securing means
109 joint connections
109*a* receiving means
110 joint elements
111 thickened region
112 abutments
113 abutments
114, 115 extensions
114*a* receiving means
116, 117 recess
120 transverse bar
121 end regions
122 fixing means
123 connecting portion
130 chain portion
150, 160 plate lines
170 plate line
180 upper run
181 lower run
182 direction-changing region
201A, 201B first end abutment surfaces
202A, 202B counterpart abutment surfaces
211A, 211B inner abutment surfaces
212A, 212B second outer abutment surfaces
221A, 221B first counterpart abutment surfaces
222A, 222B second counterpart abutment surfaces
301A, 301B end counterpart abutment surfaces
302A, 302B second end abutment surfaces
311A, 311B first outer abutment surfaces
312A, 312B second inner abutment surfaces
321A, 321B outer counterpart abutment surfaces
322A, 322B inner counterpart abutment surfaces
521, 522 curved material regions
523 hollow space
G air gap
H heightwise axis or direction
L longitudinal direction
R axis of rotation S1 heightwise central plane or heightwise plane
S2 longitudinal plane
L1 plate longitudinal direction
M1 central plane
R1 axis of rotation

What is claimed is:

1. An energy guide chain to guide at least one line, the energy guide chain comprising:
   two parallel plate lines, wherein each plate line includes side plates which are connected together by a flexible joint connector and are angleable relative to each other,
   wherein the flexible joint connector is elastically deformable in an angulation direction of the side plates and the plate lines are connected together by transverse bars,
   wherein the transverse bars with the side plates define a receiving space to receive the at least one line,
   wherein the side plates include abutment surfaces which, in a straight relative position of the side plates, bear against each other and include abutment surfaces which, in a completely angled relative position of the side plates, bear against each other,
   wherein laterally protruding projections of a first side plate engage into recessed pockets of an adjacent second side plate and, in the straight relative position, at least first abutment surfaces of the projections cooperate with first counterpart abutment surfaces of the pockets and, in the completely angled relative position, at least second abutment surfaces of the projections cooperate with second counterpart abutment surface of the pockets,
   wherein the first side plate and the second side plate, at least with their abutment surfaces are in themselves of a symmetrical configuration, wherein each side plate of the first side plate and the second side plate has at least two projections having first and second abutment surfaces and each side plate of the first side plate and the second side plate has at least two pockets having first and second counterpart abutment surfaces, the two projections and the two pockets of each side plate of the first side plate and the second side plate being provided symmetrically,
   wherein the at least two projections of each side plate of the first side plate and the second side plate project away from the receiving space and the at least two abutment pockets of each side plate of the first side plate and the second side plate open towards the receiving space, or vice-versa.

2. The energy guide chain according to claim 1, wherein provided in both of the plate lines as the side plates are respectively different outer plates and inner plates which alternate in a longitudinal direction of the chain,
   wherein both the inner plates and the outer plates in relation to their heightwise plane, which extends perpendicularly to a longitudinal direction and which extends perpendicularly to the longitudinal direction of the chain and at least substantially perpendicularly to the side plates, are respectively of a mirror-image symmetrical configuration in themselves with their abutment-operative abutment surfaces so that identical outer plates and identical inner plates are useable in both plate lines and that each outer plate includes two projections and two pockets and each inner plate includes two projections and two pockets.

3. The energy guide chain according to claim 1, wherein the outer plates and the inner plates in each case with respect to a longitudinal plane which extends in a longitudinal direction of the chain and at least substantially perpendicularly to the side plates, has two mutually opposite heightwise regions and provided at the outer plates and the inner plates are respective projections in the one heightwise region and pockets are provided in the other opposite heightwise region.

4. The energy guide chain according to claim 2, wherein the pockets of the outer plates open towards the receiving space and the projections of the outer plates project away from the receiving space and the pockets of the inner plates open towards the receiving space and the projections of the inner plates project away from the receiving space.

5. The energy guide chain according to claim 1, wherein there are provided in both plate lines continuously successive structurally identical side plates which are rotationally symmetrical at least with their abutment-operative abutment surfaces in relation to a heightwise axis which extends perpendicularly to a longitudinal direction of the chain and at least substantially parallel to the side plates.

6. The energy guide chain according to claim 5, wherein the side plate has two projections which project away from the receiving space and two projections which project towards the receiving space and the side plate has two pockets which open towards the receiving space and two pockets which open away from the receiving space.

7. The energy guide chain according to claim 2, wherein the transverse bars are fixed releasably to transverse bar receiving means of the side plates.

8. The energy guide chain according to claim 7, wherein each of the transverse bar receiving means forms a clamping receiving means which is in one piece with the side plate having two clamping surfaces which are in opposite relationship in the longitudinal direction of the chain and between which a fixing portion of complementary shape of the transverse bar is or can be clamped, wherein the clamping surfaces include a convex latching region.

9. The energy guide chain according to claim 3, wherein the energy guide chain is configured to guide the at least one line between connecting locations, of which at least one connecting location is moveable relative to another connecting location and the energy guide chain is displaceable upon relative movement of the connecting locations with a formation of an upper run and a lower run which merge into each other by way of a direction-changing region and wherein the side plates have narrow sides which extend substantially in the longitudinal direction and face away from each other.

10. The energy guide chain according to claim 9, wherein the narrow sides which are inward in the direction-changing region or face towards the respective other run form a rectilinear support which is interruption-free in the longitudinal direction, and/or
    wherein the narrow sides of the side plates, that are outward in the direction-changing region or face away from the respective other run, include a deformable damping region to damp the transition of the direction-changing region into the lying lower run.

11. The energy guide chain according to claim 10, wherein the damping region includes a bridge-shaped spring element which is formed in one piece with the narrow side of the side plate and which is connected at both sides to the narrow side.

12. The energy guide chain according to claim 1, wherein two adjacent side plates are respectively connected together by a separate joint connector or a longitudinal portion with three or more side plates are connected together by a common joint connector.

13. The energy guide chain according to claim 2, wherein each side plate respectively has a thickened central region and adjoining same at least two thinner overlap regions, with which the side plates overlap in the longitudinal direction, wherein further end abutment surfaces which face substantially in the longitudinal direction are provided at the end at the central region and at the end at the overlap regions to cooperate in abutment-operative relationship.

14. The energy guide chain according to claim 1, wherein the first and second abutment surfaces and cooperating therewith first and second counterpart abutment surfaces are of a mutually congruently convexly or concavely curved configuration.

15. The energy guide chain according to claim 14, wherein the respectively connected side plates are held to each other by the joint connector with a lateral air gap.

16. The energy guide chain according to claim 2, wherein provided at the end on the inner plate or outer plate are two oppositely disposed projecting stiffening extensions which in the straight position respectively engage into a corresponding stiffening receiving means at the central region of the connected outer or inner plate.

17. The energy guide chain according to claim 1, wherein provided at least at a thickened central region of the side plate is at least one material recess having a plurality of defining surfaces.

18. The energy guide chain according to claim 1, wherein each side plate is made in one piece from plastic.

19. The energy guide chain according to claim 1, wherein the or each joint connector is formed of an elastic plastic or more flexible plastic than the side plates.

20. The energy guide chain according to claim 1, wherein two respective side plates are connected by a joint connector, wherein the side plates have fixing receiving means which are open in a longitudinal direction and in which a respective fixing end of the joint connector is fixed.

21. The energy guide chain according to claim 20, wherein the joint connector is sized with an overlength such that the joint connector is compressed in the straight position of the side plates.

22. An energy guide chain side plate, comprising:
the side plate configured such that a plurality of the side plates are connectable by a flexible joint connector to constitute a plate line and are angleable relative to each other,
wherein the side plate includes laterally protruding projections and corresponding recessed pockets in order, upon connection of two side plates in a straight relative position, to cause at least first abutment surfaces of the projections to cooperate with first counterpart abutment surfaces of the pockets and, in a completely angled relative position, to cause at least second abutment surfaces of the projections to cooperate with second counterpart abutment surfaces of the pockets,
wherein the side plate at least with its abutment surfaces is in itself of a symmetrical configuration and includes at least two projections having first and second abutment surfaces and at least two pockets having first and second counterpart abutment surfaces,
wherein the two projections and the two pockets are provided symmetrically on the side plate,
wherein the side plate has a first side and a second side that faces away from the first side, the first side comprising the at least two projections, which laterally protrude from the first side, and the second side comprises at least two pockets, which are recessed in the second side.

23. The side plate according to claim 22, wherein the side plate is an outer plate or an inner plate.

24. An energy guide chain to guide at least one line, the energy guide chain comprising:
a plurality of hingedly interconnected chain links which form a receiving space for receiving and guiding the at least one line,
wherein the chain links have oppositely disposed plates having inner and outer side surfaces and narrow sides substantially parallel to a longitudinal direction of the energy guide chain,
wherein at least some of the links have at least one transverse bar which releasably connects the plates together and which at both oppositely disposed end regions has fixing means to releasably fix to a plate of the respective chain link,
wherein the plates respectively have fixing means to releasably fix the corresponding transverse bar fixing means,
wherein moreover the plates have joint connections which are hingedly connectable together with corresponding joint connections of the plates of the adjacent chain link optionally by separate joint elements,
wherein the hingedly interconnected plates of chain links arranged in succession in the longitudinal direction of the chain form at least two laterally mutually spaced plate lines which extend in the longitudinal direction of the chain and between which is arranged at least a part of the receiving space for the at least one line,
wherein successive chain links of the energy guide chain are variable in position relative to each other by virtue of the joint connections between adjacent links or plates,
wherein the plates include abutment surfaces which bear against each other in a straight relative position of the plates and abutment surfaces which bear against each other in a completely angled relative position of the plates,
wherein extending continuously over a chain portion which includes at least more than three adjacent chain links and which includes the at least two or all of the plate lines the plate lines are overall made up continuously from structurally identical plates, which are rotationally symmetrical at least with their abutment-operative abutment surfaces in relation to a heightwise axis which extends perpendicularly to the longitudinal direction of the chain and at least substantially parallel to the plates, so that the respective plate can be arranged selectively at any position at each of the various lines of the chain portion,
wherein the chain has three or more laterally mutually spaced plate lines extending in the longitudinal direction of the chain.

25. The energy guide chain according to claim 24, wherein in respect of a first pair of adjacent first and second plate lines first chain links are provided, wherein the plates arranged in different plate lines are connected together with transverse bars releasable at both end regions, thereby providing chain links, and there are provided second chain links in respect of which the plates arranged in different plate lines are not connected together with transverse bars, and in the two adjacent first and second plate lines first and second chain links are arranged in succession in the longitudinal direction of the chain and that in respect of a further third plate line of the energy guide chain there are provided said first and second chain links which are disposed in succession in the longitudinal direction of the chain.

26. The energy guide chain according to claim 25, wherein the second plate line is arranged between the first and the third plate line and that provided at the second plate line are plates which are releasably connected by transverse bars only to plates of the first plate line, and/or the second plate line further has plates which are releasably connected by transverse bars only to plates of the third plate line.

27. The energy guide chain according to claim 24, wherein there are provided three or more plate lines, wherein at least one plate line is arranged between two adjacent plate lines, forming a first, a central second and a third plate line, wherein the second plate line is releasably connected with transverse bars to the two adjacent plate lines and (i) selected plates of the second plate line are either connected only to plates of the first plate line or only to plates of the third plate line, or (ii) selected plates of the second plate line are releasably connected with transverse bars to plates of both adjacent plate lines.

28. The energy guide chain according to claim 24, wherein there are provided three or more plate lines, wherein at least one plate line is arranged between two adjacent plate lines, forming a first, a central second and a third plate line, wherein the second plate line is releasably connected with transverse bars to the two adjacent plate lines and the second plate line has plates which at one of the plate narrow sides of the respective plate is connected by a releasable transverse bar to the first plate line and at the other narrow side of the same plate is connected by a releasable transverse bar to the third plate line.

29. The energy guide chain according to claim 24, wherein the plates of the three plate lines are of the same structural configuration.

30. The energy guide chain according to claim 1, wherein the two projections and the two pockets of each side plate of the first side plate and the second side plate are provided in mirror-image symmetry relative to a heightwise plane or rotationally symmetrical relative to a heightwise axis of the respective side plate.

31. The side plate according to claim 22, wherein the two projections and the two pockets are provided in mirror-image symmetry relative to a heightwise plane or rotationally symmetrical relative to a heightwise axis of the side plate.

\* \* \* \* \*